United States Patent
Kim et al.

(10) Patent No.: US 11,204,766 B2
(45) Date of Patent: Dec. 21, 2021

(54) PROACTIVE DI/DT VOLTAGE DROOP MITIGATION

(71) Applicant: Intel Corporation, Santa Clara, CA (US)

(72) Inventors: Jason Seung-Min Kim, San Jose, CA (US); Nitin N. Garegrat, San Jose, CA (US); Anitha Loke, Santa Clara, CA (US); Nasima Parveen, San Jose, CA (US); David Y. Fang, San Jose, CA (US); Kursad Kiziloglu, Pleasanton, CA (US); Dmitry Sergeyevich Lukiyanchenko, Beaverton, OR (US); Fabrice Paillet, Portland, OR (US); Andrew Yang, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 166 days.

(21) Appl. No.: 16/557,187

(22) Filed: Aug. 30, 2019

(65) Prior Publication Data
US 2019/0384603 A1    Dec. 19, 2019

(51) Int. Cl.
    *G06F 9/30* (2018.01)
(52) U.S. Cl.
    CPC ................ *G06F 9/30083* (2013.01)
(58) Field of Classification Search
    None
    See application file for complete search history.

(56) References Cited

U.S. PATENT DOCUMENTS

| | | | |
|---|---|---|---|
| 2009/0049219 A1* | 2/2009 | Nishida | G06F 9/3861 710/267 |
| 2009/0167770 A1* | 7/2009 | Navale | G06F 1/3296 345/501 |
| 2010/0318814 A1* | 12/2010 | Chung | H02M 3/156 713/300 |

(Continued)

OTHER PUBLICATIONS

Carroll, Aaron, et al., "An Analysis of Power Consumption in a Smartphone", 2010 USENIX Conference, Jun. 2010, available at https://www.researchgate.net/profile/Gernot_Heiser/publication/215697458_An_Analysis_of_Power_Consumption_in_a_Smartphone/links/02bfe50f711449579f000000/An-Analysis-of-Power-Consumption-in-a-Smartphone.pdf, 15 pages.

(Continued)

*Primary Examiner* — Danny Chan
(74) *Attorney, Agent, or Firm* — Alliance IP, LLC

(57) ABSTRACT

Embodiments include a method comprising identifying, by an instruction scheduler of a processor core, a first high power instruction in an instruction stream to be executed by an execution unit of the processor core. A pre-charge signal is asserted indicating that the first high power instruction is scheduled for execution. Subsequent to the pre-charge signal being asserted, a voltage boost signal is asserted to cause a supply voltage for the execution unit to be increased. A busy signal indicating that the first high power instruction is executing is received from the execution unit. Based at least in part on the busy signal being asserted, de-asserting the voltage boost signal. More specific embodiments include decreasing the supply voltage for the execution unit subsequent to the de-asserting the voltage boost signal. More Further embodiments include delaying asserting the voltage boost signal based on a start delay time.

23 Claims, 19 Drawing Sheets

(56) References Cited

U.S. PATENT DOCUMENTS

| | | | | |
|---|---|---|---|---|
| 2013/0047166 | A1* | 2/2013 | Penzes | G06F 12/14 |
| | | | | 718/105 |
| 2015/0019886 | A1* | 1/2015 | Lim | G11C 16/26 |
| | | | | 713/310 |
| 2020/0050251 | A1* | 2/2020 | Naik | G06F 1/324 |
| 2020/0304112 | A1* | 9/2020 | Zhang | H02H 1/0007 |
| 2020/0408832 | A1* | 12/2020 | Hovis | G06F 1/3206 |

OTHER PUBLICATIONS

Wikipedia, "Voltage droop", last updated Aug. 28, 2019, accessed at https://en.wikipedia.org/w/index.php?title=Voltage_droop&oldid=912903996, 2 pages.

Wikipedia, "Voltage drop", update dated May 17, 2019, accessed at https://en.wikipedia.org/w/index.php?title=Voltage_drop&oldid=897488863, 4 pages.

Yee, Chang Fei, "Reducing PDN impedance at high frequencies", EDN Network, Mar. 31, 2015, 7 pages.

\* cited by examiner

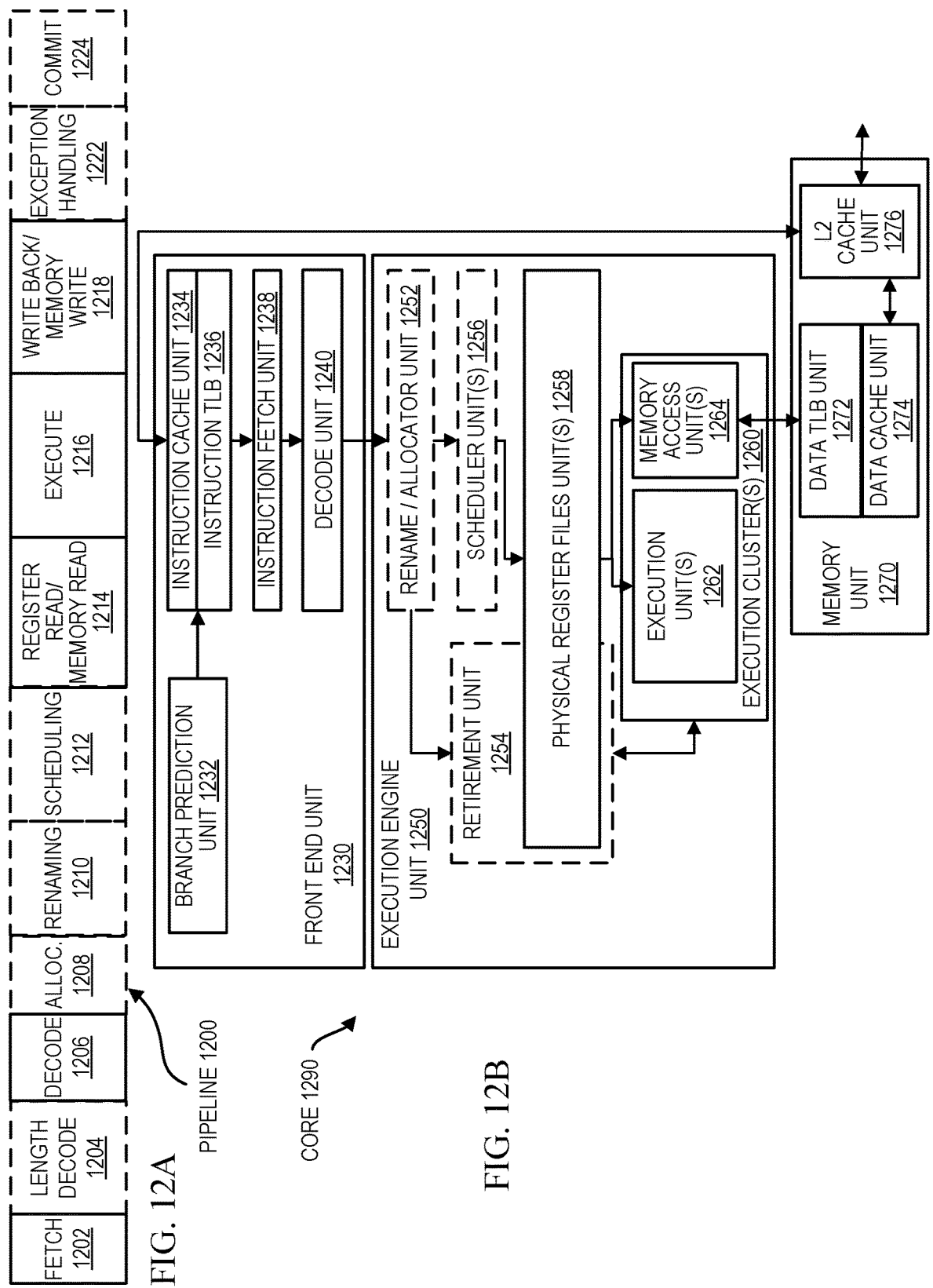

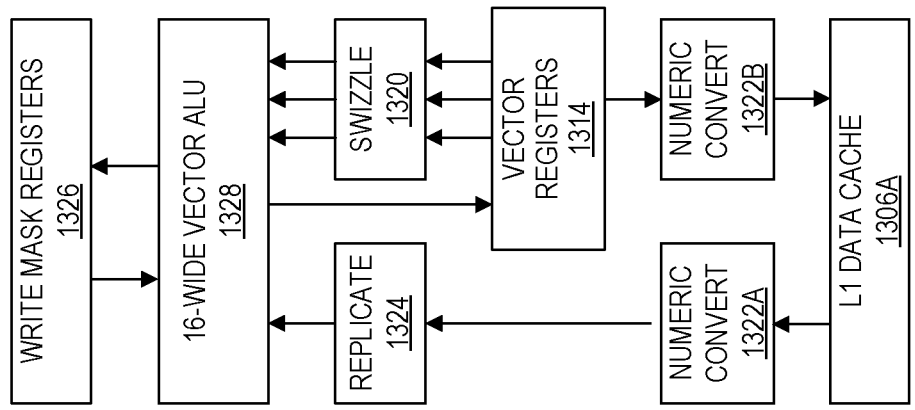
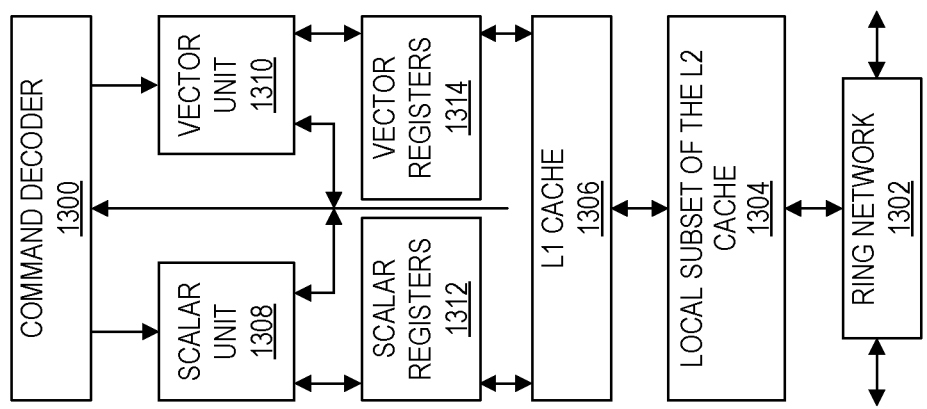

PROACTIVE DI/DT VOLTAGE DROOP MITIGATION

TECHNICAL FIELD

This disclosure relates in general to the field of computers and, more particularly, to proactive Di/Dt voltage droop mitigation.

BACKGROUND

The demand for high performance computing is growing exponentially. Parallel execution units, such as matrix processing units (MPUs), are often employed in high performance computing because they allow processes or operations to be performed simultaneously. In one form of parallel execution, an instruction stream can be broken into independent phases or parts. Assuming no dependencies prevent simultaneous execution, each execution unit can execute a phase of the instruction stream simultaneously with a different execution unit executing another phase of the instruction stream. Moreover, two or more execution units may execute the phases in parallel. This can improve the speed of execution of the task being performed. Parallelization has been used as an alternative to frequency scaling, which can be limited by physical constraints. Parallel execution units, however, are limited by the inability of a voltage regulator to mitigate large voltage droops (Vmin) resulting from sudden changes in workload power demands (Di/Dt).

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIG. 12A is a block diagram illustrating both an exemplary in-order pipeline and an exemplary register renaming, out-of-order issue/execution pipeline according to embodiments of the present disclosure.

FIG. 12B is a block diagram illustrating both an exemplary embodiment of an in-order architecture core and an exemplary register renaming, out-of-order issue/execution architecture core to be included in a processor according to embodiments of the present disclosure;

FIGS. 13A-13B illustrate a block diagram of a more specific exemplary in-order core architecture, which core would be one of several logic blocks (including other cores of the same type and/or different types) in a chip;

DETAILED DESCRIPTION OF EMBODIMENTS

Figure 1:
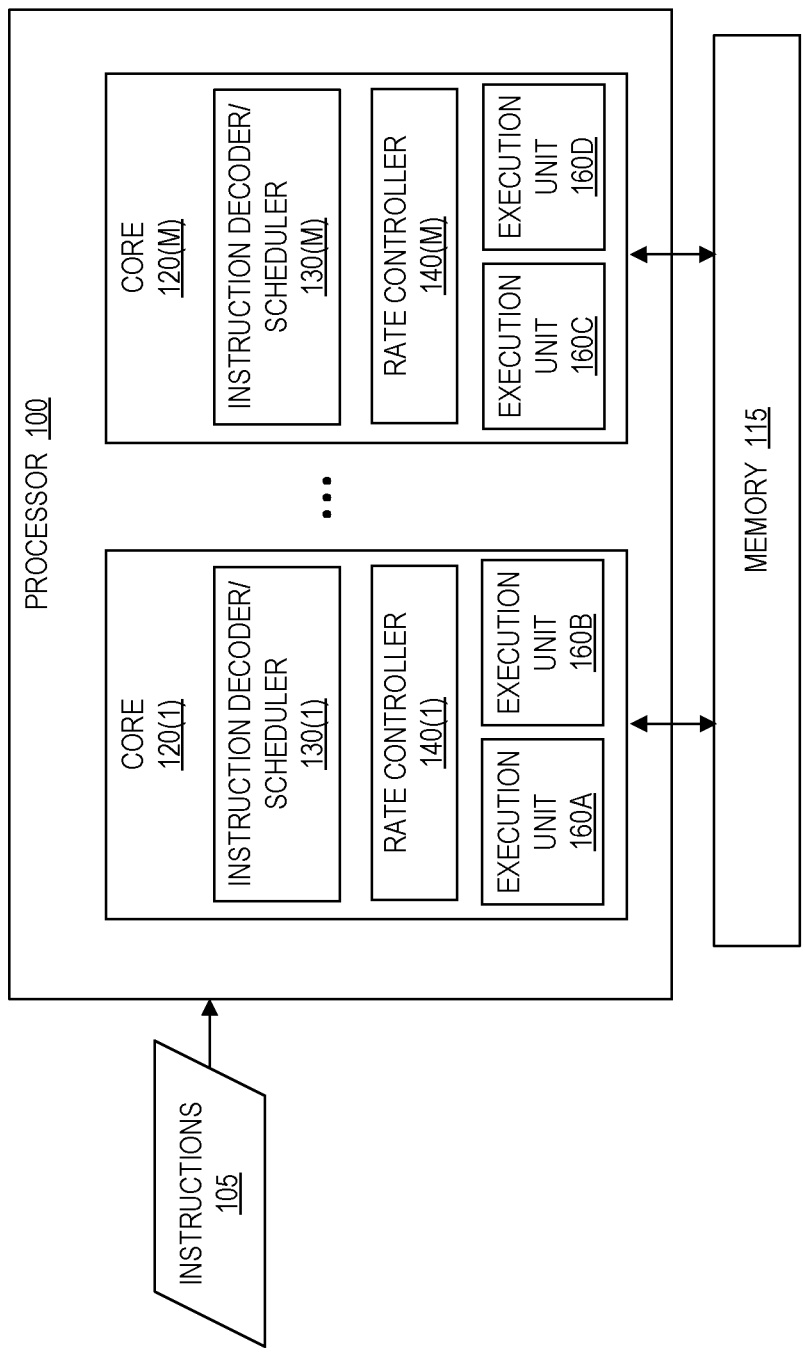
FIG. 1 is a simplified block diagram illustrating high level components of a processor with a proactive Di/Dt voltage droop mitigation capability according to at least one embodiment of the present disclosure.

The following disclosure provides various possible embodiments, or examples, for implementing features disclosed in this specification. These features are related to proactive Di/Dt voltage droop mitigation capability for a processing element, such as a central processing unit (CPU). A proactive Di/Dt voltage droop mitigation capability can be implemented in processors that include one or more cores with multiple execution units. In a system with a proactive Di/Dt voltage droop mitigation capability, incoming instruction queues are analyzed to detect high power instructions. For example, high power instructions may be used by machine learning processes that involve multiple layers of computations. When high power instructions are detected, a temporary boost of supply voltages are requested upon scheduling of the instruction stream transitioning from lower power instructions to high power instructions. When the high power instruction completes or when a voltage regulator catches up to be able to compensate for the higher power demand, the temporary boost of supply voltage may be halted.

For purposes of illustrating the several embodiments of a processor with a proactive Di/Di voltage droop mitigation capability, it is important to first understand the operations and activities associated with parallel processing and transitioning between high power instructions and lower power instructions. Accordingly, the following foundational information may be viewed as a basis from which the present disclosure may be properly explained.

Historically, frequency scaling resulted in improvements in computer performance. Increasing clock frequency while maintaining other factors constant generally decreases runtime for an application. Increasing frequency, however, also increases the amount of power used in a processing element. This is shown by the formula to calculate power consumption, P:

$$P = C \times V^2 \times F$$

C=Capacitance switched per clock cycle
V=Voltage
F=clock cycles per second

More recently, parallel execution has been utilized to alleviate the issues of power consumption and critical device temperatures. Parallel execution units are configured to perform operations of a task simultaneously in order to speed up execution completion of the task. Voltage regulators that supply power to parallel executions, however, are often unable to mitigate large voltage droops (Vmin) caused by sudden changes in workload power demands (Di/Dt), where Di/Dt is the instantaneous rate of current change in amps/second. Voltage droop is the loss in output voltage from a device as it attempts to drive a load. In one example, voltage droop can be caused by not supplying a current to a processor that is sufficient to drive a heavy load, such as a high power instruction (e.g., running in parallel).

When a compute instruction changes from single thread scalar operations to multi-thread parallel operations, the power demand for the central processing unit (CPU) can change instantaneously from a low power state to an extremely high-power state. These sudden changes in the power demand can cause a sharp voltage drop on the CPU supply lines because of the voltage regulator's inability to quickly compensate for the sudden power losses on a resistive power delivery network. When voltage drops lower, the associated CPU operating frequency also drops lower. When the voltage drops below the minimum supply voltage (Vmin) required to maintain the maximum operating frequency (Fnnax), the system fails because the voltage has dropped below a sustainable frequency.

Generally, three approaches have been used to avoid these types of system failures due to sudden voltage drops. First, a system may be designed to operate at below a maximum frequency so that the voltage minimum threshold is lower. Second, a system may be designed to operate with higher voltages. This creates a greater range for the voltage to drop without dropping below Vmin. Third, power supplies to systems may be enhanced to minimize power delivery network (PDN) impedances. Current solutions may use any combination of these techniques. Indeed, some systems may employ a combination of all three techniques. The particular techniques that are implemented on a given computing system may depend on the characteristics of that computing system. For example, mobile devices tend to operate at lower frequencies, performance devices tend to operate at higher voltages, and premium devices tend to operate with beefed-up (or enhanced) power supplies. A combination of the three techniques attempts to address all of the issues presented by various characteristics of computing devices.

These current techniques are inadequate for mitigating Di/Dt voltage droop and compromise on cost, performance, and/or reliability. For example, the lower frequency solution sacrifices performance, the high voltage solution sacrifices reliability and wastes power, and the enhanced power supply solution sacrifices cost. Solutions that rely on a combination of the three techniques sacrifice some level of cost, performance, and reliability. In short, even a combination of available techniques to mitigate voltage droop is a trade-off of compromised choices.

A proactive Di/Dt voltage droop mitigation technique resolves many of the aforementioned issues (and more). In particular, a voltage droop mitigation technique maximizes compute performance without sacrificing reliability or enhancing power supplies. In at least one embodiment, a core is configured to detect expected power surges based on analyzing instruction queues for high power instructions. The core can inform voltage regulators when the high power parallel execution units are being scheduled to run. Thus, a request for a temporary boost of supply voltages can be made to accommodate the transition to high power instructions. The voltage regulator supplies a temporary voltage boost to compensate for the expected voltage drop when the parallel engines start to execute the high power instructions. Subsequently, the temporary voltage boost may be stopped when the high power instruction completes or when the voltage regulator catches up to be able to compensate for the higher power demand.

In the proactive Di/Dt voltage droop mitigation technique, a voltage boost request may be timed to execute just prior to the execution of high power instructions such that the increasing power consumption coincides with the increasing supply power. In this scenario, the net effect of change in demand and supply is canceled, which results in net-zero changes on the CPU operating voltages. Thus, proactive Di/Dt voltage droop mitigation can provide higher performance, higher efficiency, and higher hardware utilization. First, higher performance can be achieved since the CPU can run at maximum frequencies by maintaining constant CPU voltages levels by proactive scheduling of the voltage regulators and the parallel execution units to achieve equilibrium of power supply and demand. Second, one or more embodiments enable the CPU to run at maximum efficiency because, unless high power instructions are scheduled for execution, the supply voltage can be maintained at near Vmin, which provides maximum operating frequency. Finally, one or more embodiments allow the CPU to run more reliably because the voltage applied to the CPU is maintained at near Vmin, which asserts minimum stress on the silicon of the device. Therefore, higher performance products can be produced while users of the products benefit from more reliable systems with lower cost voltage regulators.

Turning to FIG. 1, a brief description is now provided about a possible processor 100 with a proactive Di/Dt voltage mitigation capability. Processor 100 includes at least one core 120(1)-120(M) and memory 115. Cores 120(1)- 120(M) include one or more respective execution units, such as execution units 160A and 160B in core 120(1) and execution units 160C and 160D in core 120(M). It should be noted that two execution units are shown in each of the cores for example purposes but that cores 120(1)-120(M) may include any number of execution units. In one or more embodiments, cores 120(1)-120(M) also include respective instruction decoder and schedulers 130(1)-130(M) and rate controllers 140(1)-140(M). In coordination with signals from the instruction decoder and scheduler and the execution units, rate controllers 140(1)-140(M) may be configured to proactively mitigate voltage droop caused by sudden changes in workload power demands on the execution units of the cores.

Memory 115 can include system memory, which may be separate from cores 120(1)-120(M). In at least some embodiments, memory 115 may be implemented as high bandwidth memory (HBM). Processor 100 may be configured as a single die or may include additional cores, execution units, and memory for a two-die configuration. In one example, cores 120(1)-120(M) can be implemented as tensor processing cores (TPCs) and execution units 160A,

160B, 160C, 160D may be implemented as matrix processing units (MPUs). The cores may form a tensor processing cluster.

In one or more embodiments, an application may be compiled into code the includes instructions 105. The compiled code with instructions 105 may be fetched from memory and stored in a buffer by processor 100. In one example, execution units 160A-160D may be configured to run (e.g., execute) instructions from the code in parallel. For example, a matrix multiply (MM) instruction involves multiplying two matrices, which includes many operations to multiply the elements of each row in a first matrix by the elements of each column in a second matrix and add the products. Accordingly, many of the operations may be performed in parallel by two more execution units.

In a tensor processing core (TPC), the TPC execution units (e.g., matrix processing units (MPUs)) can be used to perform multiple levels of work for an application, such as a deep neural network (DNN) machine learning application. Instructions of a DNN application can be provided to each of the MPUs, and data can be distributed to each MPU to compute its own results. The results of the MPUs can be combined to generate a result for the particular level of work. The data can be returned to memory, new data can be distributed to the MPUs, and new results can be computed by each of the MPUs based on the previous level's result and the new data. This process may be performed repeatedly using parallel processing by MPUs until a final result is reached.

Instructions 105 can be decoded by an instruction decoder and scheduler (e.g., 130(1)-130(M)) and analyzed to identify whether a particular instruction is a high power instruction or a lower power instruction. A rate controller (e.g., 140(1)-140(M)) can request a temporary boost of supply voltage based on scheduling an instruction stream transitioning from lower power instructions to high power instructions. The rate controller can further request the temporary boost of supply voltage be stopped when the high power instructions are completed or when a voltage regulator is able to compensate for the higher power demand.

Figure 2:
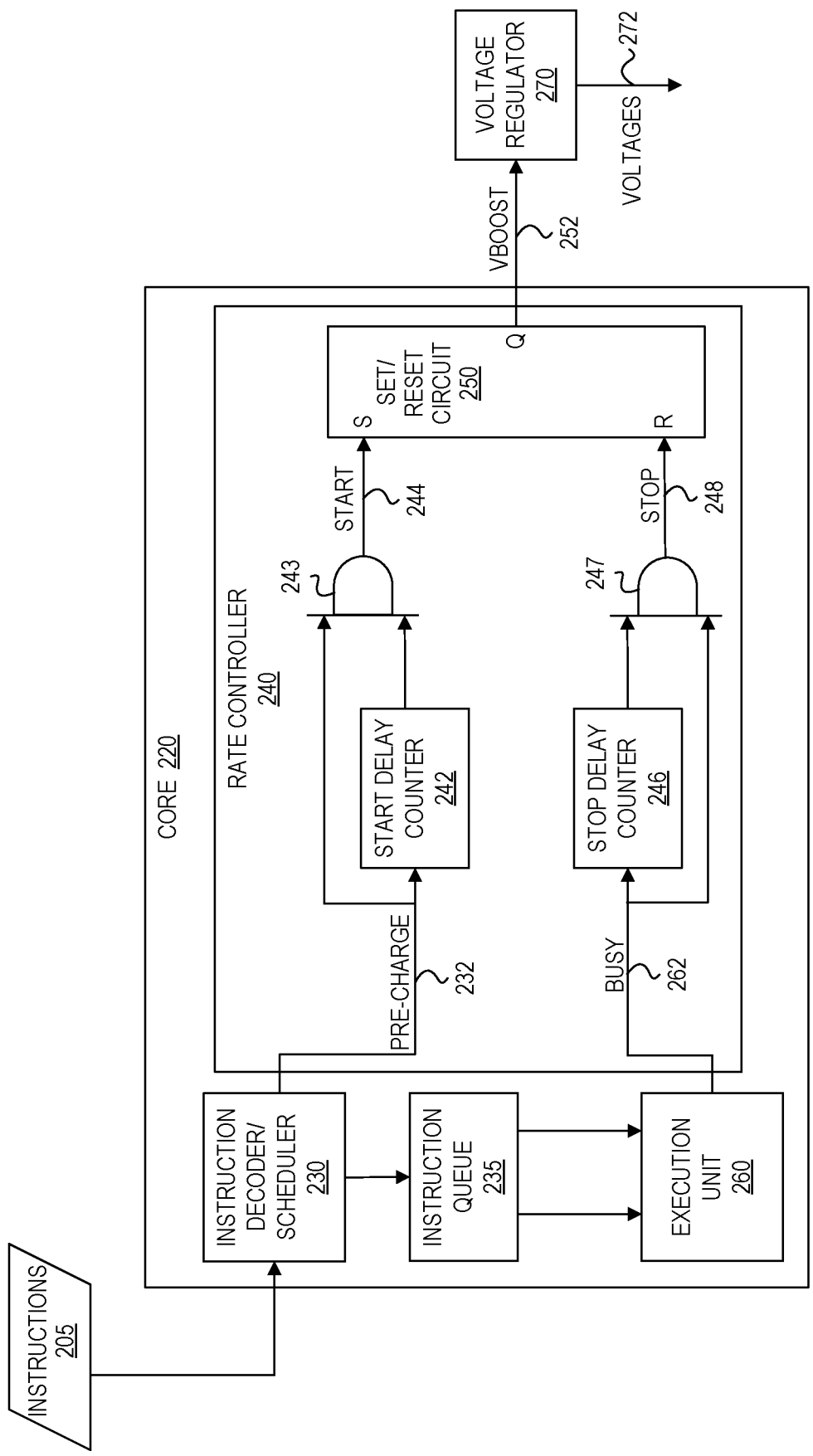
FIG. 2 is a simplified block diagram illustrating possible implementation details of a proactive Di/Dt voltage droop mitigation capability in a core of a processor according to at least one embodiment.

FIG. 2 is a block diagram illustrating possible details of a core 220 configured with a proactive Di/Dt voltage droop mitigation capability. Input to core 220 can include instructions 205 of an instruction stream, and output includes a voltage boost (Vboost) signal 252 communicated to a voltage regulator 270 for supplying voltage to components in core 220 (and other cores in the processor). Core 220 shows possible implementation details of cores 120(1)-120(M) of processor 100. Core 220 can include an instruction decoder and scheduler 230, an instruction queue 235, a rate controller 240 and an execution unit 260. In at least one embodiment, rate controller 240 can include circuitry configured with start and stop delay counters 242 and 246, start and stop AND gates 243 and 247, and a set/reset circuit 250.

In one or more examples, instruction decoder and scheduler 230 may include instruction decoder circuitry and scheduler circuitry. Instruction decoder circuitry can be configured to decode instructions 205 in an instruction stream. Scheduler circuitry can be configured to perform a scheduling stage in an execution pipeline to schedule the instructions 205 for execution. Instructions 205 can be scheduled using instruction queue 235, which can be accessed by execution unit 260. In one or more embodiments, the scheduler circuitry in the instruction decoder and scheduler 230 may be enhanced to detect high power instructions. Instruction decoder and scheduler 230 can assert a pre-charge signal 232 to start delay counter 242 when a high power instruction is detected.

Detection of high power instructions may be achieved by distinguishing high power instructions from low power instructions. For example, deep learning (e.g., deep neural network (DNN)) applications often include instructions that involve multiplication of thousands of different multipliers at the same time. A matrix multiply (MM) instruction used in many deep learning applications is one example involving the multiplication of large matrices. Other examples include but are not limited to instructions using vector-based processes to perform significant calculations. These types of instructions typically require significantly more power than other instructions such as reading data from memory, for example. Thus, high power instructions may be detected by distinguishing matrix multiply instructions (or similar instructions that perform significant computations) from other instructions in an instruction stream. Detection of high power instructions in an instruction stream makes a priori identification of power surges in the instruction stream possible.

Execution unit 260 may execute instructions from instruction queue 235 in parallel with other execution unit(s) in core 220 and/or in other cores (e.g., 120(1)-120(M)). Instructions may include compute instructions that perform deep neural network (DNN) instructions for machine learning applications requiring significant compute resources. For example, an MM instruction to multiply matrices may be executed by execution unit 260. Execution unit 260 can assert a busy signal 262 when the execution unit initiates execution of a high power instruction, such as a matrix multiply instruction.

Start delay counter 242 and stop delay counter 246 may be programmable timers that are utilized to screen out continual use of high power instructions from the usual use of low power instructions to accommodate different voltage regulator capabilities. In at least one embodiment, start delay counter 242 can be tuned to a start delay time. The start delay time can be in the form of a start delay count value that sets the number of clock cycles to be counted by start delay counter 242 after receiving pre-charge signal 232. After assertion of pre-charge signal 232, Vboost signal 252 can be asserted after the start delay time expires. The start delay counter 242 determines when the start delay time expires by counting the clock cycles until the start delay count value is reached. Thus, the start delay time can be calculated as follows:

start delay time (ns)=start delay count value (programmed number of clock cycles)*clock period (ns/clock cycle)

In one or more embodiments, the start delay time is a setup time 356 for the Vboost signal 252, during which the high power instruction has not yet started executing. The start delay count value may be selected to minimize the Vboost setup time 356, but not to result in execution being initiated before the Vboost signal is asserted. It should be noted that the start delay count value can be the same for every instruction or may be different from instruction to instruction.

In one example, the start AND gate 243 is used to output start signal 244 based on inputs from pre-charge signal 232 and start delay counter 242. Thus, when a pre-charge signal has been received, and start delay counter 242 reaches the programmed start delay count value, then a high (e.g., binary 1) start signal 244 can set the set/reset circuit 250 to assert Vboost signal 252.

In at least one embodiment, stop delay counter 246 can be tuned to a stop delay time. The stop delay time can be in the form of a stop delay count value that sets the number of clock cycles for which the Vboost signal 252 should remain asserted. In at least one embodiment, the stop delay time can be in the form of a stop delay count value that sets the number of clock cycles to be counted by stop delay counter 246 after execution of the high power instruction begins (e.g., after busy signal 262 is asserted). After assertion of busy signal 262, Vboost signal 252 can be de-asserted after the stop delay time expires. The stop delay counter 246 determines when the stop delay time expires by counting the clock cycles until the stop delay count value is reached. Thus, the stop delay time can be calculated as follows:

stop delay time (ns)=stop delay count value (programmed number of clock cycles)*clock period (ns/clock cycle)

In one or more embodiments, the stop delay time is the hold time 358 for the Vboost signal 252. The stop delay count value may be selected to minimize the Vboost hold time 358 during which the supply voltage is temporarily raised above minimum voltages. It should be noted that the stop delay count value can be the same for every instruction or may be different from instruction to instruction.

In one example, the stop AND gate 247 is used to output stop signal 248 based on input from busy signal 262 and stop delay counter 246. Thus, when a busy signal has been received, and stop delay counter 246 reaches the programmed stop delay count value, then a high (e.g., binary 1) stop signal 248 can reset the set/reset circuit 250 to de-assert Vboost signal 252.

In one or more embodiments, set/reset circuit 250 may be configured as a set/reset flip-flop circuit, with a set (S) input, which is based on a pre-charge signal 232 and a start delay time and a reset (R) input, which is based on a busy signal and a stop delay time (or hold time). Output (Q) is triggered to a high state by the set (S) signal input and holds the value until it is reset to low by the reset (R) signal input. Vboost signal 252 is generated when output (Q) is triggered to the high state and may be asserted to voltage regulator 270.

Voltage regulator 270 may be implemented using any suitable architecture. In one example, a digital voltage regulator architecture (dFIVR) may be used to implement voltage regulator 270. Voltage regulator 270 may include a voltage regulator (VR) compensation circuit (also referred to herein as a 'Vboost circuit'), which performs a VR compensation function in response to receiving Vboost signal 252 as input. A VR compensation function can include increasing or 'boosting' supply voltage to a maximum voltage (Vmax) allowed by the system when triggered by Vboost signal 252.

In one or more implementations, embodiments herein may be implemented on a deep neural network (DNN) accelerator ASIC. Execution unit 260 may be a matrix processing unit (MPU) in a tensor processing core (TPC) of a tensor processing cluster and may perform matrix multiply (MM) instructions. Instruction decoder and scheduler 230 may be implemented as a microcode controller (MCC) on TPCs of the DNN accelerator. Proactive Di/Dt voltage droop mitigation logic may utilize the MCC on TPCs within the DNN accelerator ASIC to detect high-power instructions from the low-power instructions. Although proactive Di/Dt voltage mitigation logic may be implemented in TPCs, it should be apparent that the concepts disclosed herein may be applicable to numerous other architectures employing various hardware configurations. Thus, the references and description of TPCs is not intended to be limiting but instead, is intended for illustration purposes to further explain and clarify possible embodiments.

Figure 3:
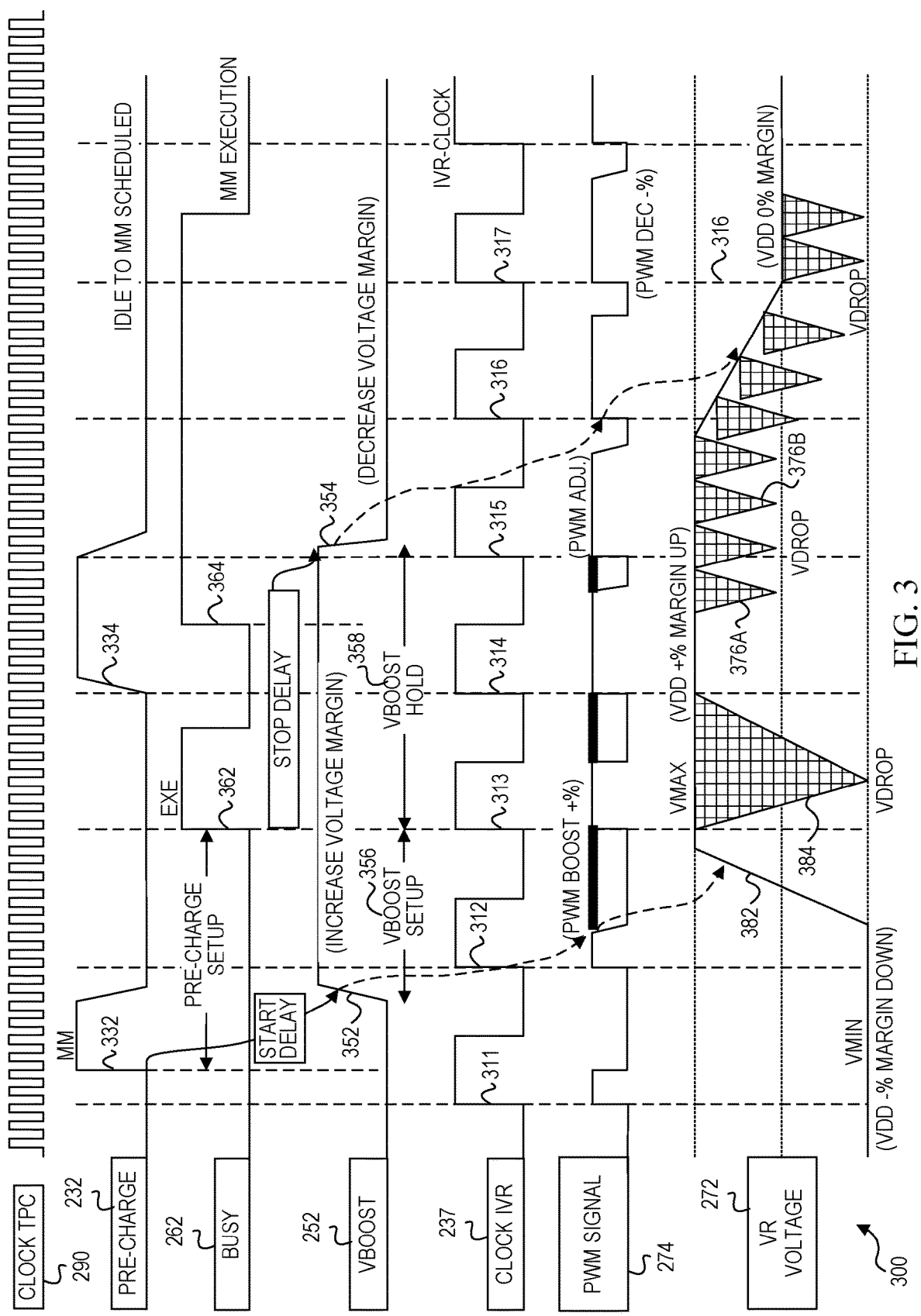
FIG. 3 is a timing diagram illustrating an example proactive Di/Dt voltage droop mitigation of changes in workload power demands on a processor according to at least one embodiment.

FIG. 3 is a timing diagram 300 illustrating an example scenario of proactive Di/Dt voltage droop mitigation of changes in workload power demands according to at least one embodiment. Operation of a processor with proactive Di/Dt voltage droop mitigation capability will now be described with reference primarily to FIGS. 2 and 3.

In timing diagram 300, a clock signal 290 is generated for execution unit 260 to execute instructions 205. Pre-charge signal 232, busy signal 262, and Vboost signal 252 are initially low (i.e., 0). An integrated voltage regulator (IVR) clock signal 237 is generated for the output voltage of voltage regulator 270. IVR clock signal 237 has seven clock cycles 311-317 in timing diagram 300.

In one or more embodiments, voltage regulator 270 may be implemented as a fully integrated digital voltage regulator (e.g., digital frequency integrated voltage regulator (dFIVR)), which uses a pulse width modulated (PWM) control mechanism to generate compensation voltages. Because the voltage regulator utilizes digital PWM, the preset value of the PWM could be quickly switched from nominal voltage to a higher percentage compensation voltage with a simple digital selection signal, such as Vboost signal 252. Timing diagram 300 also shows PWM signal 274 and a voltage regulator (VR) voltage signal 272. VR voltage signal 272 starts at Vmin, which is the minimum voltage required to maintain the maximum operating frequency (Fmax).

During operation, an instruction stream with instructions 205 may be downloaded by core 220 into a buffer and accessed by instruction decoder and scheduler 230. In at least one embodiment, the scheduler of instruction decoder and scheduler 230 monitors the instruction stream and detects a high power signal. For example, the scheduler can detect signals transitioning from IDLE to MM signals (or some other known high power signal).

When a high power instruction is detected (e.g., by an enhanced scheduler), pre-charge signal 232 is asserted to notify voltage regulator 270 that a high-power instruction is scheduled for parallel execution, for example by execution unit 260. Values of programmable start delay counter 242 and stop delay counter 246 can be tuned to align execution of the high power instructions and the boosting of the associated voltage regulators (e.g., 270) to minimize time during which higher voltage is to be used to compensate for the expected voltage drop before the voltage regulator is able to adjust for the new high power demands. Accordingly, start delay counter 242 may delay the assertion of the Vboost signal 252 based on a certain amount of time (e.g., programmed number of clock cycles). In timing diagram 300, assertion of Vboost signal 252 is delayed from the pre-charge assertion at 332 to Vboost assertion at 352.

In response to Vboost signal 252 being asserted at 352, voltage regulator 270 switches to higher voltage at 382, which compensates for the expected voltage drop due to the scheduled high power instruction. As shown in timing diagram 300, the voltage signal 272 reaches Vmax (maximum voltage) just prior to execution unit 260 initiating execution of the high power instruction, which is indicated by busy signal 262 at assertion point 362. When execution of the high power instruction (e.g., MM instruction that activates 1024 instances of multiply and accumulate engines) begins, the increased power draw creates a significant voltage drop 384. Because Vboost signal 252 had pre-scheduled the voltage regulator 270 to increase voltage to compensate for the expected voltage drops, however, the effective voltage seen by the execution unit 260 does not fall below the Vmin (minimum voltage to maintain maximum clock frequency). Thus, the cores (e.g., 120(1)-120(M), 220) can maintain full clock frequency (e.g., 290) even during the high power instruction execution. Otherwise, a system without this proactive Di/Dt voltage mitigation logic may fail due to the sharp voltage drop when the supply voltage is kept at nominal voltage.

When execution unit 260 begins executing the high power instruction, the execution unit asserts a busy signal 262, as shown at 362. Assertion of the busy signal triggers de-assertion process of the Vboost signal 252. In one or more embodiments, stop delay counter 246 delays the de-assertion based on a hold time (e.g., programmed number of clock cycles). Once the hold time is reached, then the Vboost signal 252 can be de-asserted at 354. The hold time is configured to ensure that the voltage regulator 270 will have caught up and will be able to respond to newly increased power levels without maintaining the boost.

If no other high power instructions have been scheduled, then at 354, voltage regulator 270 can lower the voltage level to an appropriate level. In some scenarios, the voltage level may be lowered to Vmin (minimum voltage), where it can remain until another high power instruction is scheduled.

In another scenario, as shown in timing diagram 300, another high power instruction may be scheduled subsequent to the first high power instruction being scheduled but before the Vboost signal is de-asserted. In timing diagram 300, pre-charge signal 232 is asserted again at 334. Subsequently, execution unit 260 begins executing the second high power instruction, and the busy signal 262 is asserted again at 364. Because the Vboost signal 252 is still asserted at 364, another Vboost signal is not asserted. Voltage signals 272 are high enough to handle voltage drops such as 376A-376B of the second high power instruction. Thus, Vboost signal 252 is de-asserted based on the stop delay counter 246 reaching the stop delay count value after being initiated in response to the first assertion of busy signal 262 at 362. In other implementations, a subsequent assertion of the busy signal 262 at 364, again triggers the de-assertion process of Vboost signal 252. In this implementation, stop delay counter 246 restarts the stop delay count to delay the de-assertion of Vboost signal 252. Thus, the Vboost signal may be asserted for a longer period of time because the stop delay count is restarted in response to the subsequent assertion of the busy signal at 364. In some scenarios, however, it may be more desirable to minimize the amount of time that Vboost signal is asserted. In such scenarios, the stop delay counter is not restarted and the Vboost signal is de-asserted based on the stop delay count initiated in response to the prior assertion of the busy signal (e.g., at 362).

Once Vboost signal 252 is de-asserted, voltage regulator 270 can lower the voltage level to an appropriate level. In this scenario, because the second high power instruction is still executing when the Vboost signal is de-asserted, the voltage signal 272 may be lowered to a nominal voltage level (e.g., in between Vmin and Vmax) where the voltage boost is no longer supplied but the execution unit has sufficient voltage to prevent a voltage drop below Vmin.

Figure 4:
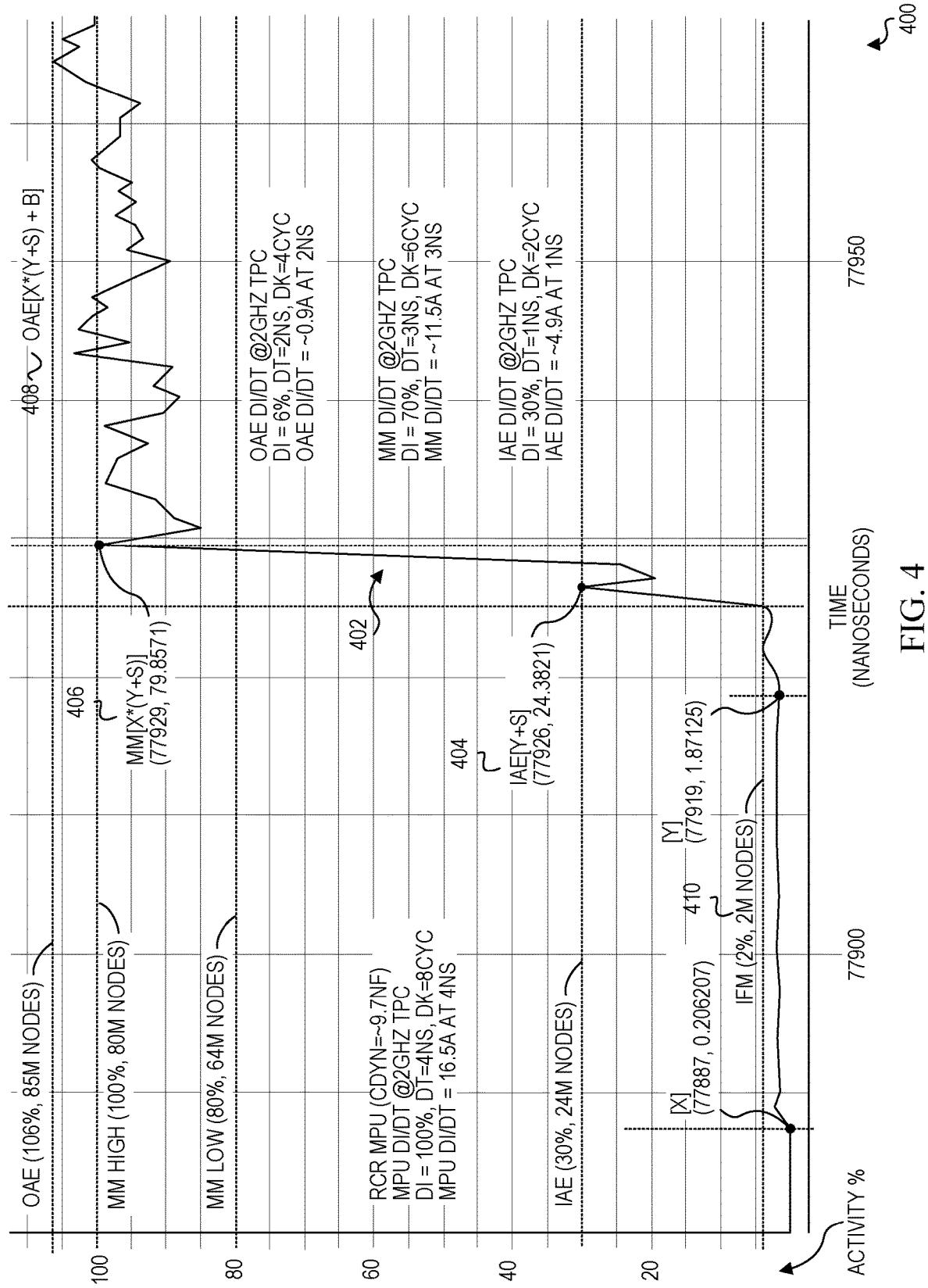
FIG. 4 is a graph showing an example surge current in a matrix processing unit when executing a matrix multiply instruction.

Turning to FIG. 4, FIG. 4 is a graph 400 depicting Di/Dt power consumption expected when an execution unit of a processor starts to execute a high power instruction. More specifically, a power simulation waveform 402 shows possible current surge of 16.5 A within a 4 nanosecond (ns) time frame when a matrix processing unit (MPU) starts to execute matrix multiply (MM) instructions. As the number of cores that are integrated in the processor increases, the resultant power surge increases proportionally. For example, a processor with 40 cores could have a resultant power surge as high as 660 A when an execution unit in all 40 cores start MM instructions.

At least some of the data for the MM instruction can be fetched by an input feature map (IFM) operation 410. IFM operation 410 may read memory, fetch [X] and [Y] operands, and store the operands in a multidimensional array for the MPU to use. This operation performs at an approximately 2% power demand using 2 million nodes.

Preprocessing can be performed on [X] and [Y] operands by input arithmetic engine (IAE) operation 404 to prepare the data for a multiplier. The IAE operation 404 causes an initial spike A parallel matrix multiply (MM) and summation instruction 406 causes a second spike of 100% power demand and 80 million nodes. Thus, the MPU rises 16.5 A from the low end to the high end in 4 nanoseconds. The power supply, which typically works in microseconds, receives a massive power demand in only 4 nanoseconds. Thus, the power supply cannot accommodate such a high power demand in such a short timeframe.

After the computation is finished, an output arithmetic engine (OAE) operation 408 can manipulate the output by, for example, shifting the results to scale them down. This manipulation may be performed at the high power level.

Figure 5:
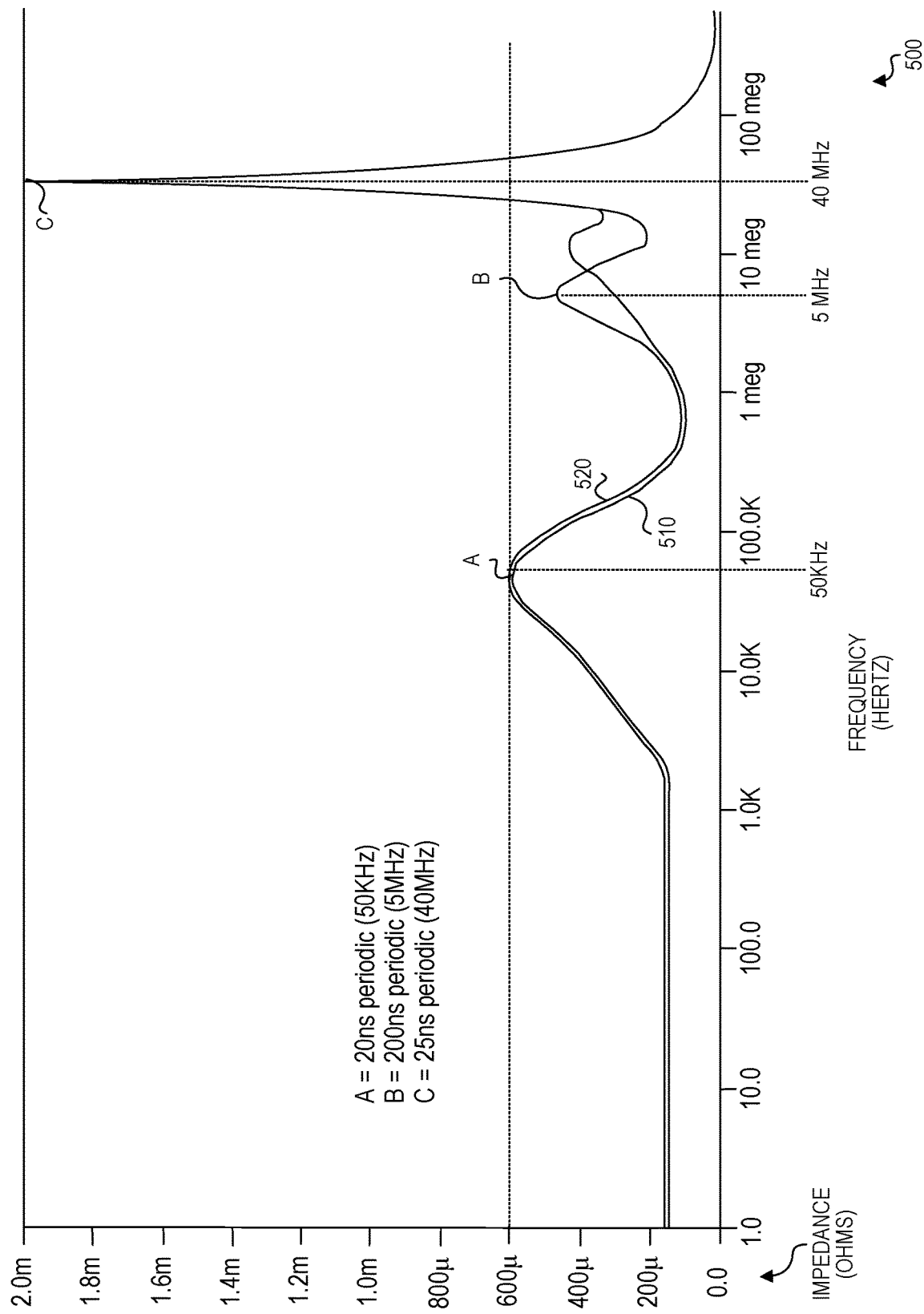
FIG. 5 is a graph showing example power delivery to a high performance computing platform.

FIG. 5 is a graph 500 depicting a typical example of power delivery network Impedance for a high-performance computing platform. The example computing platform includes 40 tensor processing cores (TPCs), where the maximum current is 16.4 A (9.7 nF Cdyn at 0.85V, 2 GHz). A graph line 510 shows impedance for a previous plan of record (POR) with 10 µF DSC, and a graph line 520 shows impedance for a final POR with 1 µF DSC.

The alternating current (AC) characteristic impedance shown in graph 500 is around 200 µOhm for frequencies below 10 KHz, and the typical worst case impedances are around 600 µOhm at operating supply voltage of around 50 KHz and 5 MHz. Consequently, in this common scenario, the worst case voltage droop could be up to −46% (˜394 µV drop) when all cores (e.g., 40 cores) start executing MM instructions. Without increasing the supply voltage or lowering the PDN impedances significantly, this system is likely to fail.

An embodiment with the characteristics shown in graph 500 may be configured with proactive Di/Dt voltage mitigation capability to prevent system failure. If a system is typically run at 800 mV (milli-volts), then the 394 mV drop is almost half of the voltage on which the system runs. To compensate for this, the voltage needs to be increased by at least 200 mvolts to be at the half-way point. The system in this scenario may need to be run at 1.2 volts instead of 800 mV. The proactive Di/Dt voltage mitigation logic offers the ability to keep the voltage at 0.85V and compensate only at times when it is needed to transition to maximum voltage (e.g., for matrix multiply instructions).

Figure 6:
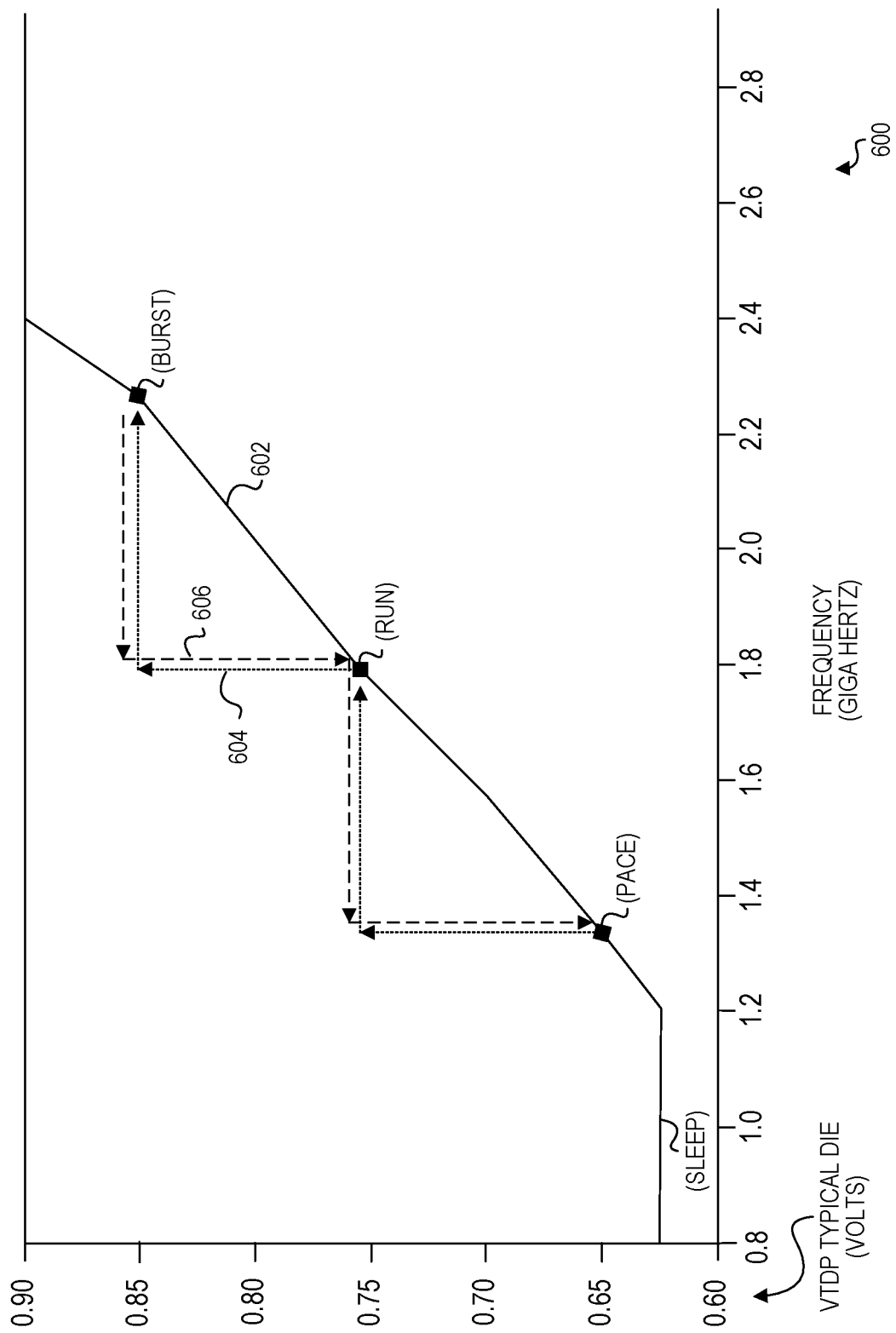
FIG. 6 is a graph showing example operating voltages and associated operating frequency characteristics of a high performance processing element.

FIG. 6 is a line graph 600 depicting typical operating voltages and associated operating frequency characteristics of a high performance central processing unit (CPU). Line graph 600 shows a line 602 plotting voltage versus frequency for an example CPU. Plots on line 602 include SLEEP, PACE, RUN, and BURST. SLEEP indicates little or no work is being performed and therefore, minimum power is needed. PACE is a voltage and frequency used when the system is intentionally slowed to save power. RUN is a normal frequency and operating point. Finally, BURST indicates there is significant work to be done (e.g., MM instruction), and so increased voltage is needed.

Line graph 600 illustrates that reduced voltages translate to reduced frequencies. More specifically, when CPU voltage drops due to an increased current draw, in order to prevent system failure, the system can be compensated to run at higher voltage or lower frequencies.

Traditional systems typically run at higher voltage and lower frequencies to avoid system failures resulting from sudden voltage drops to accommodate high power instructions. In an example, a CPU may have computation bound workloads that run above the minimum voltage (Vmin). These workloads could run at a higher performance at the same power by enabling a better frequency to voltage curve and running at slightly lower voltage. For example, consider using the RUN frequency and voltage in which a CPU runs at 1.8 GHz and 0.75 v. If the system voltage drops to PACE voltage (e.g., 0.65 v), then the frequency needs to drop to approximately 1.3 GHz to avoid system failure. If the voltage is increased to 0.85 v and the system is run at 1.8 GHz, as indicated by line 604, then the needed frequency of 1.8 GHz for a voltage drop at 606 could be maintained. Thus, running the system at a higher voltage with a lower frequency can minimize system failure. In such a configuration, however, excess power indicated at 604 is wasted.

One or more embodiments described herein dynamically perform compensation voltage generation by requesting the voltage regulators to compensate for the surging current expected from the execution of the scheduled instructions that have been detected. Thus, one or more embodiments both prevent system failures and minimize power waste by proactive, dynamic mitigation of voltage droop caused by high power instructions.

Figure 7:
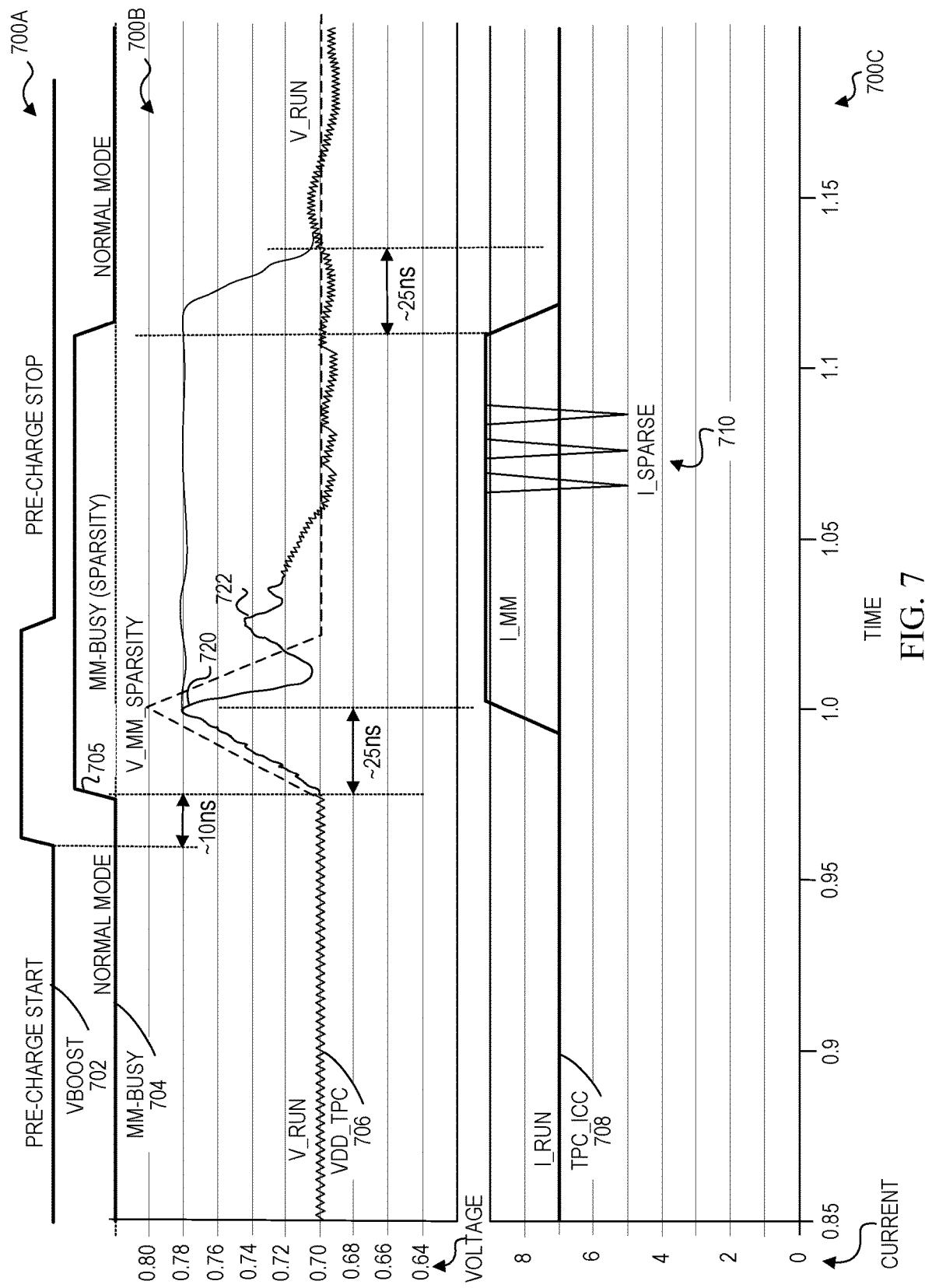
FIG. 7 is a graph showing how the proactive Di/Dt voltage droop mitigation capability could be used in conjunction with other advanced power management techniques.

FIG. 7 shows complementary graphs 700A, 700B, and 700C depicting how the proactive Di/Dt voltage droop mitigation technique could be used in conjunction with other advanced power management that utilizes dynamic voltage and frequency scaling techniques. In particular, the proactive Di/Dt voltage droop mitigation technique may be applied to scenarios where sparsity occurs during a high power instruction execution. Sparsity occurs when multiplication is performed and many of the factors to be multiplied are zero. For example, in matrix multiplication, if the matrix contains zeros, then many of the calculations will be performed by multiplying some number by zero. Because the result of zero times any other number is always zero, it is not necessary to perform this computation. Thus, the proactive Di/Dt voltage droop mitigation technique may be applied to provide the initial boost of voltage when a high power instruction begins executing and then de-assert the Vboost signal when the power demand decreases due to sparsity of the matrix.

In one or more embodiments, the instruction decoder and scheduler (e.g., 130(1)-130(M), 230) can be leveraged to request an appropriate amount of voltage boost to compensate for the expected execution of the high power instructions when a high power instruction is scheduled for execution. By tuning the programmable delay counters to match the characteristic of the VR latency and the execution unit's execution pipeline, the voltage boosting and the execution of the high power instructions could be scheduled to coincide to cancel-out effective voltage droops to maintain constant (or near-constant) CPU voltage even when sparsity of the matrix reduces the power demand during execution. Such an embodiment could achieve maximum performance, reliability, and lower cost.

FIG. 7 illustrates a scenario in which the voltage droop mitigation may be configured to accommodate sparsity of an input matrix for a high power instruction. Graph 700A shows signals used to mitigate voltage droop during a high power instruction execution when the input is sparse, graph 700B shows the power demand related to the high power instruction execution, and graph 700C shows the complementary current during the high power instruction execution. In graph 700C, a TPC_ICC plot 708 shows an example of current during a high power instruction execution (e.g., MM instruction), including the current reduction 710 due to sparsity of the input. In graph 700B, a VDD_TPC plot 706 shows the power demand of the execution unit during the high power instruction execution. Graph 700A shows an MM-busy signal 704 that is asserted when the high power instruction begins executing. Graph 700A also shows a Vboost signal 702 that is asserted before the execution begins and is de-asserted sometime after the execution begins.

As shown by VDD_TPC plot 706, a first voltage spike 720 occurs just after the execution of the high power instruction begins, as indicated by an assertion at 705 of the MM-busy signal 704 (e.g., when MM-busy signal goes high). After the initial voltage spike at 720, another voltage spike at 722 occurs, and then the voltage drops down due to sparsity of the input. An embodiment to accommodate input sparsity could be configured to predict occurrences of sparsity so that voltage can be boosted to compensate for increased voltage demand (e.g., when high power instruction begins executing), and then reduced when sparsity causes the power demand to be reduced. Voltage could then be boosted again to compensate for any further voltage jumps.

Figure 8:
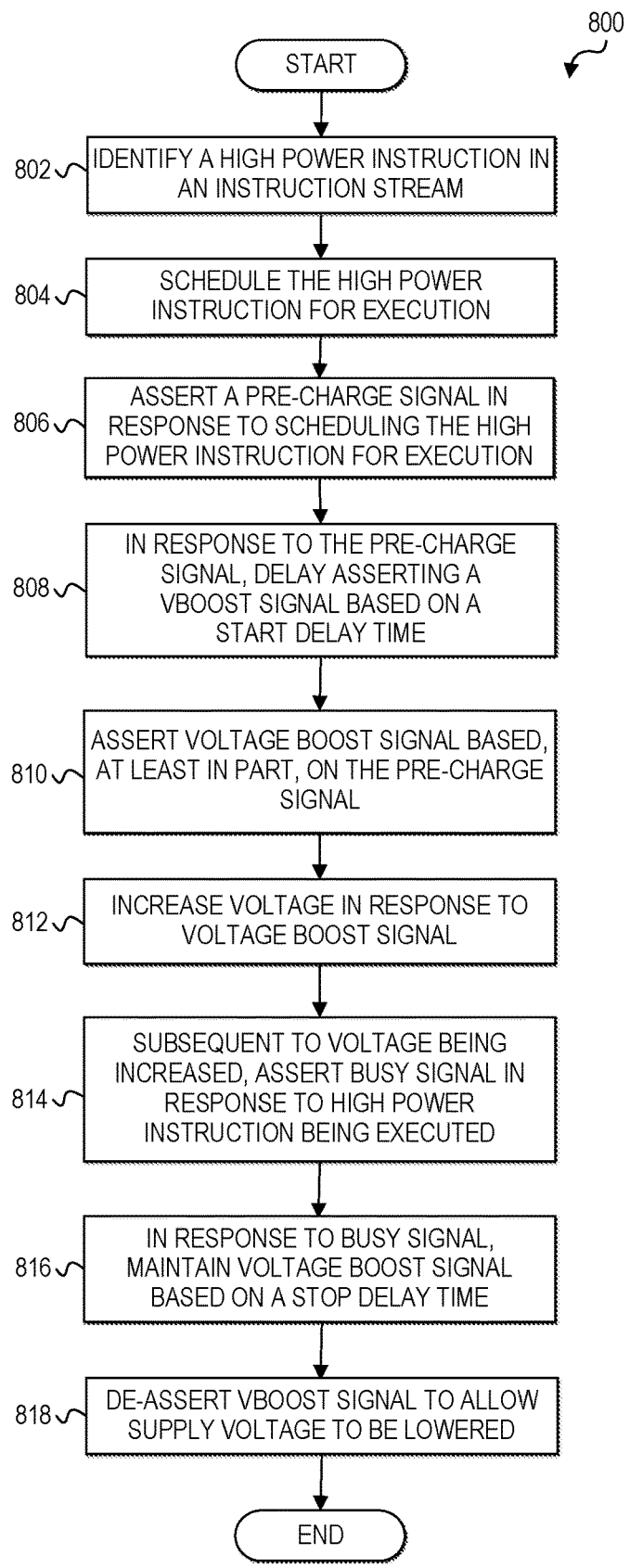
FIG. 8 is a simplified flow chart illustrating possible operations of a computing system implemented with a proactive Di/Dt voltage droop mitigation capability according to at least one embodiment.
Figure 9:
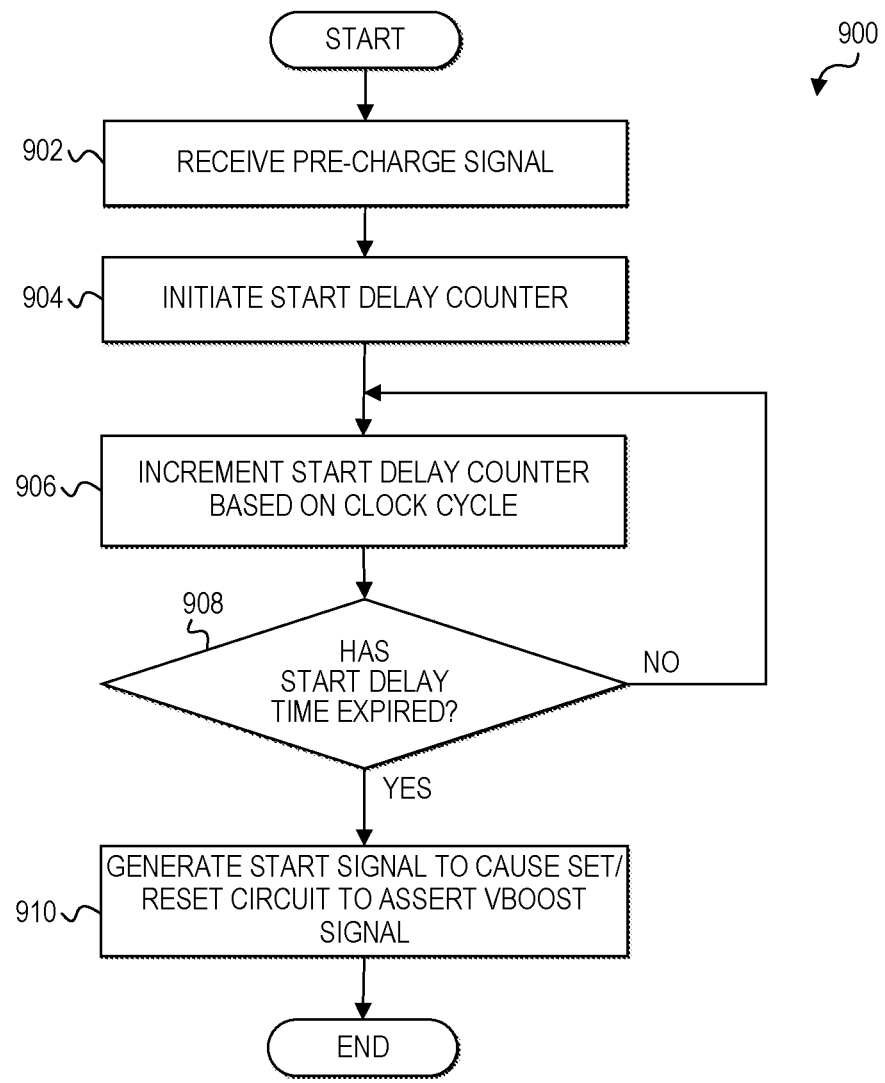
FIG. 9 is a simplified flow chart illustrating further possible operations of a computing system implemented with a software assisted power management capability according to at least one embodiment.
Figure 10:
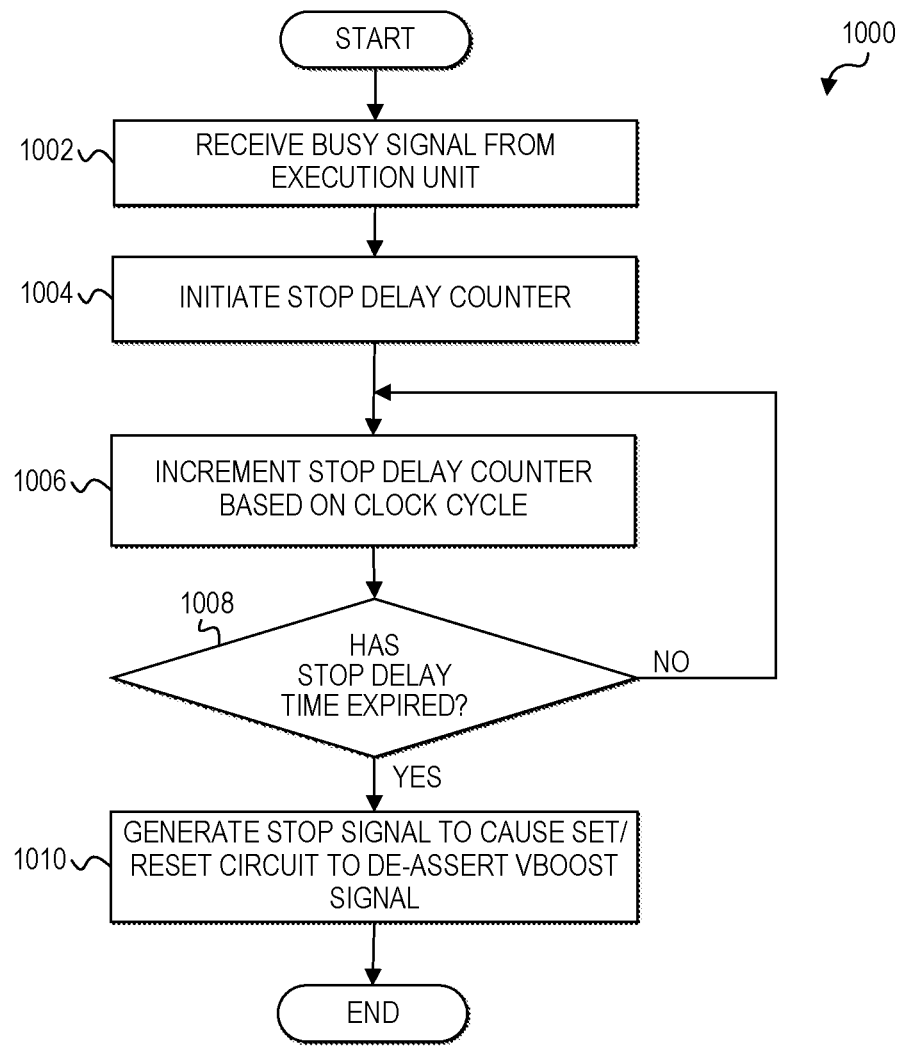
FIG. 10 is a simplified flow chart illustrating further possible operations of a computing system implemented with a software assisted power management capability according to at least one embodiment.

Turning to FIGS. 8-10, example flowcharts illustrate possible flows 800-1000 of operations that may be associated with embodiments described herein. In at least one embodiment, one or more sets of operations corresponds to activities of FIGS. 8-10. In at least one embodiment, a processor (e.g., 100) with cores (e.g., 120(1)-120(M), 220), or a portion thereof, may utilize the one or more set of operations. In particular, an instruction decoder and scheduler (e.g., 130(1)-130(M), 230), a rate controller (e.g., 140(1)-140(M), 240), and an execution unit (e.g., 160A-160D) may utilize and/or perform the one or more sets of operations. In at least one embodiment, flows 800-1000 illustrate one example of implementing a proactive Di/Dt voltage mitigation capability in a processor with multiple cores.

Generally, flow 800 of FIG. 8 illustrates proactive Di/Dt voltage mitigation when a high power instruction is scheduled and executed by an execution unit (e.g., 260) of a core (e.g., 220). At 802, a high power instruction is identified in an instruction stream. For example, a matrix multiply (MM) instruction is an example of a high power instruction that may be identified. In at least one embodiment, the high power instruction is identified by a scheduler in the core. In one implementation, the scheduler may be part of an instruction decoder and scheduler (e.g., 230). In other embodiments, the scheduler may be separate from the decoder.

At 804, the high power instruction may be scheduled for execution by the scheduler. In one example, the high power instruction may be added to an instruction queue (e.g., 235) when scheduled for execution.

At 806, a pre-charge signal is asserted in response to scheduling the high power instruction for execution. In at least one embodiment, a pre-charge signal is asserted to notify a voltage regulator (e.g., 270) that a high power instruction is scheduled for execution so that the voltage regulator can dynamically and proactively boost the supply voltage temporarily to compensate for the initial voltage droop that is to occur upon execution of the high power instruction.

At 808, in response to the assertion of the pre-charge signal, assertion of a Vboost signal to notify the voltage regulator about the high power instruction is delayed. In at least one embodiment, the pre-charge signal is sent to a start delay counter (e.g., 242) and to a start AND gate (e.g., 243). The start delay counter may be programmed with a start delay count value that indicates a number of clock cycles to count before asserting the Vboost signal. Thus, assertion of the Vboost signal is delayed until a start delay time expires, which is determined based on the start delay count value. Once the number of clock cycles counted by the start delay counter equals the start delay count value, then the start delay time has expired and the start delay counter can send a signal to the start AND gate, which can generate a start signal (e.g., 244) to trigger the Vboost signal assertion from a set/reset circuit.

At 810, the voltage boost signal is asserted to the voltage regulator based on the assertion of the pre-charge signal and the expiration of the start delay period.

At 812, the voltage regulator increases voltage in response to the assertion of the Vboost signal. In at least one embodiment, the voltage may be increased to maximum voltage (Vmax) so that there is more room to accommodate large voltage drops. In one or more embodiments, the start delay time is selected to ensure that the voltage is boosted prior to or coinciding with the high power instruction being executed.

At 814, subsequent to the voltage being increased, execution of the high power instruction is initiated and a busy signal is asserted in response to the high power instruction being executed.

At 816, in response to the assertion of the busy signal, the Vboost signal is maintained based on a stop delay time, which is also referred to herein as a 'hold time'. In one or more embodiments, the stop delay counter (e.g., 246) may be programmed with a stop delay count value that indicates a number of clock cycles to count before de-asserting the Vboost signal. Thus, de-assertion of the Vboost signal is delayed until the stop delay time (or hold time) expires, which is determined based on the stop delay count value. Once the number of clock cycles counted by the stop delay counter equals the stop delay count value, then the stop delay time has expired, and at 818, the Vboost signal is de-asserted to allow the supply voltage to be lowered to a nominal or minimum level depending on the particular scenario. For example, if another high power instruction begins executing before the first high power instruction finishes executing, then the voltage signal may be lowered to a nominal voltage level during the remaining execution of the second high power instruction. If, however, no other high power instructions are scheduled when the first high power instruction finishes executing, then the voltage signal may be lowered to a minimum voltage level.

Flow 900 of FIG. 9 illustrates possible details of activities related to delaying the assertion of a Vboost signal after a pre-charge signal is asserted. In at least one embodiment, a start delay counter (e.g., 242), a start AND gate (e.g., 243), and a set/reset circuit (e.g., 250) are coordinated to delay assertion of a Vboost signal, where the delay is based on a start delay time. One or more activities of flow 900 may occur at 808 in flow 800.

At 902, the start delay counter receives the pre-charge signal. At 904, the start delay counter is initiated in response to receiving the pre-charge signal.

At 906, the start delay counter may be incremented after a clock cycle completes. In at least one embodiment, the start delay counter may be programmed with a value indicating a start delay time in the form of a number of clock cycles to be used to delay the assertion of a Vboost signal.

At 908, a determination is made as to whether the start delay time has expired (e.g., programmed number of clock cycles have been counted). For example, if the start delay counter equals the programmed start delay count value, then the start delay time has expired.

If the start delay time has not expired, then flow returns to 906 to increment the start delay counter again based on the clock cycle. If the start delay time has expired, however, then at 910, a start signal is generated and provided to set/reset circuit 250 to trigger the assertion of a Vboost signal to the voltage regulator.

Flow 1000 of FIG. 10 illustrates possible details of activities related to delaying the de-assertion of a Vboost signal after a busy signal is asserted. In at least one embodiment, a stop delay counter (e.g., 246), a stop AND gate (e.g., 247), and a set/reset circuit (e.g., 250) are coordinated to delay assertion of the Vboost signal, where the delay is based on a stop delay time (or hold time). One or more activities of flow 1000 may occur at 816 in flow 800.

At 1002, the stop delay counter receives a busy signal. At 1004, the stop delay counter is initiated in response to receiving the busy signal.

At 1006, the stop delay counter may be incremented after a clock cycle completes. In at least one embodiment, the stop delay counter may be programmed with a value indicating a stop delay time (or hold time) in the form of a number of clock cycles to be used to delay the de-assertion of a Vboost signal.

At 1008, a determination is made as to whether the stop delay time has expired (e.g., programmed number of clock cycles have been counted). For example, if the stop delay counter equals the programmed stop delay count value, then the stop delay time has expired.

If the stop delay time has not expired, then flow returns to 1006 to increment the stop delay counter again based on the clock cycle. If the stop delay time has expired, however, then at 1010, a stop signal is generated and provided to set/reset circuit 250 to trigger the de-assertion of the Vboost signal to the voltage regulator.

FIGS. 11-19 detail exemplary architectures and systems to implement embodiments of the above (such as processor 100, core 120(1)-120(M), 220, instruction decoder and scheduler 130(1)-130(M), 230, rate controller 140(1)-140(M), 240, and execution unit 160A, 160B, 160C, 160D. In some embodiments, one or more hardware components and/or instructions described above are emulated as detailed below or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 11-19.

Embodiments of the instruction(s) detailed above may be embodied in a "generic vector friendly instruction format." In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2019; and see Intel® Advanced Vector Extensions Programming Reference, October 2014).

Figure 11:
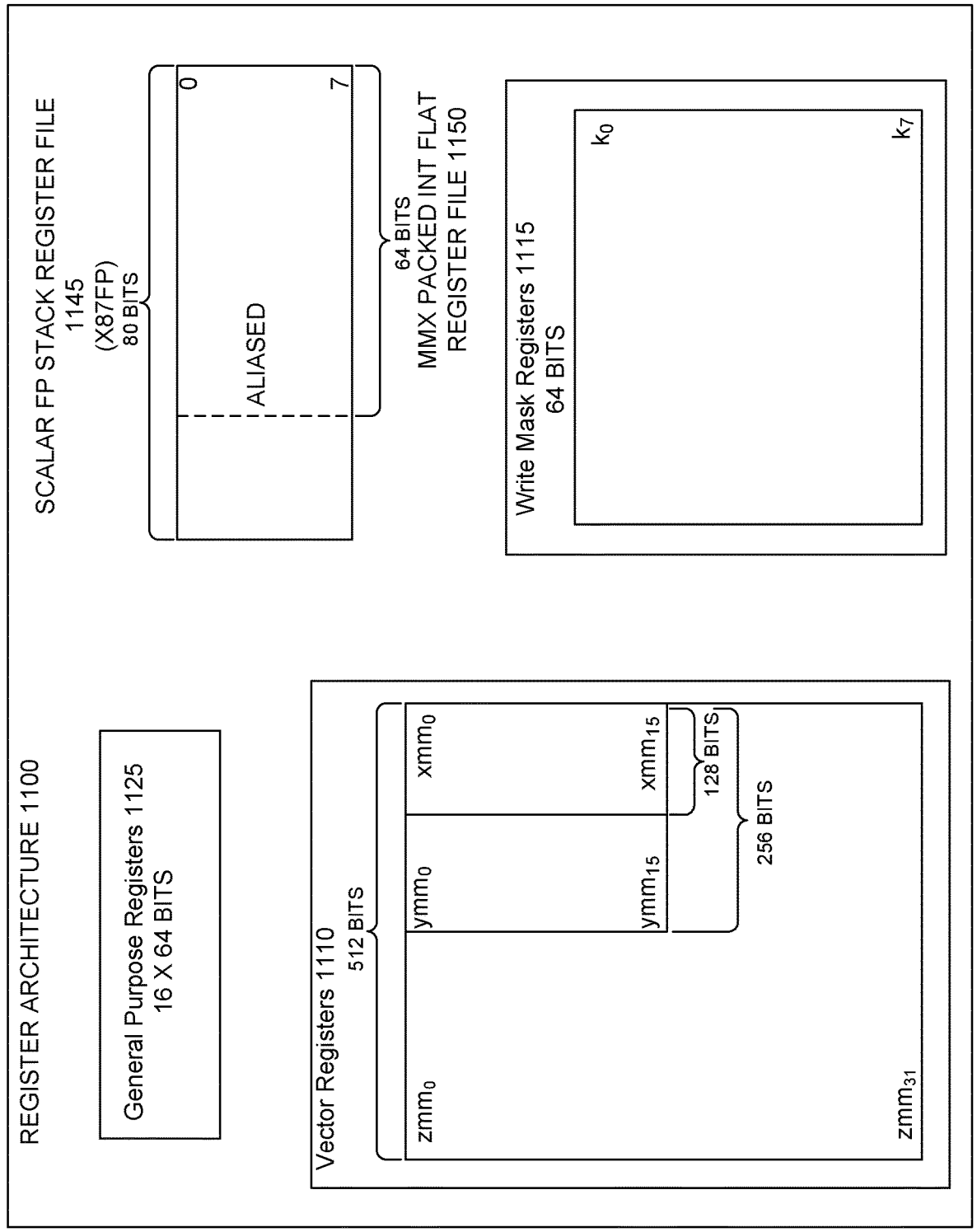
FIG. 11 is a block diagram of a register architecture according to one embodiment.

FIG. 11 is a block diagram of a register architecture 1100 according to at least one embodiment of the present disclosure. In the embodiment illustrated, there are 32 vector registers 1110 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

In other words, a vector length field selects between a maximum length and one or more other shorter lengths, where each such shorter length is half the length of the preceding length; and instructions templates without the vector length field operate on the maximum vector length. Further, in one embodiment, class B instruction templates of a specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the present disclosure may use wider or narrower registers. Additionally, alternative embodiments of the present disclosure may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 12A is a block diagram illustrating both an exemplary in-order pipeline and an exemplary register renaming, out-of-order issue/execution pipeline according to one or more embodiments of this disclosure. FIG. 12B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 12A-12B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a tensor processing core (TPC), a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions.

The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. In one or more embodiments utilizing core 1290, scheduler unit(s) 1256 may include at least some of the functionality of instruction decoder and scheduler 130(1)-130(M), 230 (or at least the scheduler of instruction decoder and scheduler 130(1)-130(M), 230). Accordingly, scheduler unit(s) 1256 may be configured to identify high power instructions in an instruction stream and to assert a precharge signal in response to scheduling a high power instruction for execution. It should be noted that this functionality may or may not be combined with decode unit 1240, or any other suitable component or circuitry of core 1290. In addition, rate controller 140(1)-140(M) may be implemented in execution engine unit 1250 and coupled to scheduler unit(s) 1256 and execution unit(s) 1262.

The scheduler unit(s) 1256 is coupled to the physical register file(s) unit(s) 1258. Each of the physical register file(s) unit(s) 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit(s) 1258 comprise a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1254 and the physical register file(s) unit(s) 1258 are coupled to the execution cluster(s) 1260.

The execution cluster(s) 1260 includes a set of one or more execution unit(s) 1262 and a set of one or more memory access unit(s) 1264. The execution unit(s) 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. In one or more embodiments utilizing core 1290, execution unit(s) 1262 may include the at least some of the functionality of execution units 160A, 160B, 160C, 160D, 260. Accordingly, execution unit(s) 1262 may be configured to assert a busy signal in response to initiating the execution of a high power instruction. In one or more examples, execution unit(s) 1262 may be matrix processing units (MPUs) of a tensor processing core (TPC).

The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access unit(s) 1264 is coupled to the memory unit 1270, which includes a data TLB unit 1272 coupled to a data cache unit 1274 coupled to a level 2 (L2) cache unit 1276. In one exemplary embodiment, the memory access unit(s) 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch unit 1238 performs the fetch and length decode stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the scheduling stage 1212; 5) the physical register file(s) unit(s) 1258 and the memory unit 1270 perform the register read/memory read stage 1214; the execution cluster(s) 1260 perform the execute stage 1216; 6) the memory unit 1270 and the physical register file(s) unit(s)

1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1474 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 13A-13B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to one or more embodiments of this disclosure. In one embodiment, a command decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the present disclosure may use a different approach (e.g., use a single register set or include a communication path that allows data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network 1302 ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to one or more embodiments this disclosure. FIG. 13B includes an L1 data cache 1306A, part of the L2 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
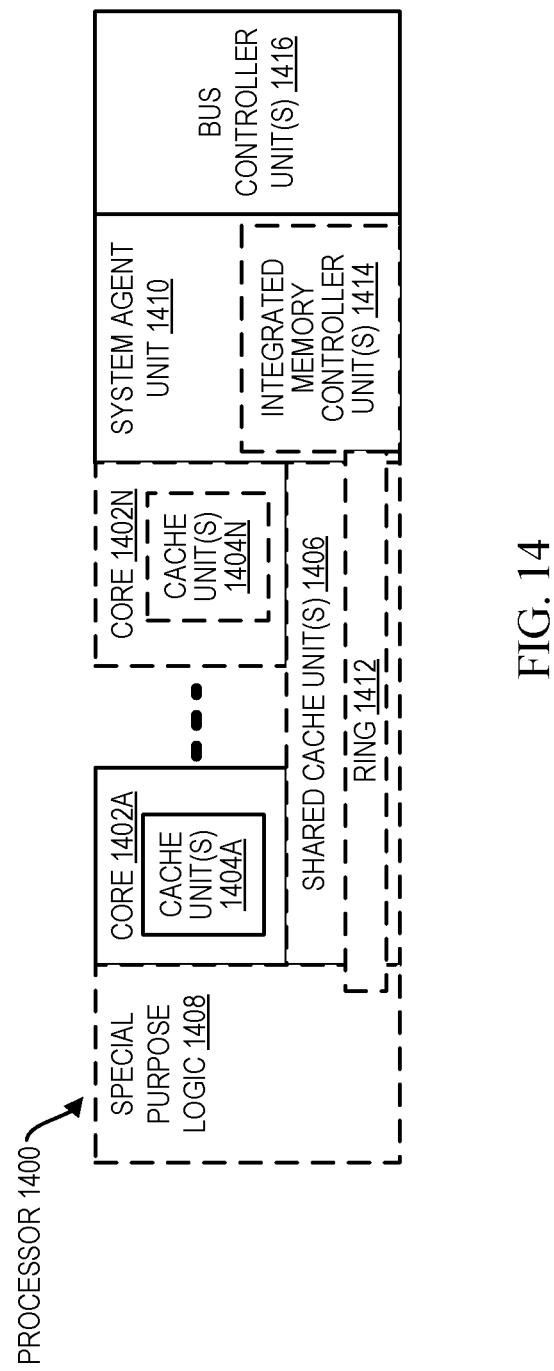
FIG. 14 is a block diagram of a processor that may have more than one core, may have an integrated memory controller, and may have integrated graphics according to embodiments of the present disclosure.

FIG. 14 is a block diagram of a processor 1400 that may have more than one core, may have an integrated memory controller, and may have integrated graphics according to one or more embodiment of this disclosure. The solid lined boxes in FIG. 14 illustrate a processor 1400 with a single core 1402A, a system agent unit 1410, a set of one or more bus controller unit(s) 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, such as cache units 1404A-N, a set or one or more shared cache unit(s) 1406, and external memory (not shown) coupled to the set of integrated memory controller unit(s) 1414. The set of shared cache unit(s) 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the special purpose logic 1408 (e.g., integrated graphics logic), the set of shared cache unit(s)

1406, and the system agent unit 1410/integrated memory controller unit(s) 1414, alternative embodiments may use any number of well-known techniques for interconnecting such units. In one embodiment, coherency is maintained between one or more cache units 1404A-N and cores 1402A-N.

In some embodiments, one or more of the cores 1402A-N are capable of multi-threading. The system agent unit 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of executing the same instruction set, while others may be capable of executing only a subset of that instruction set or a different instruction set.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
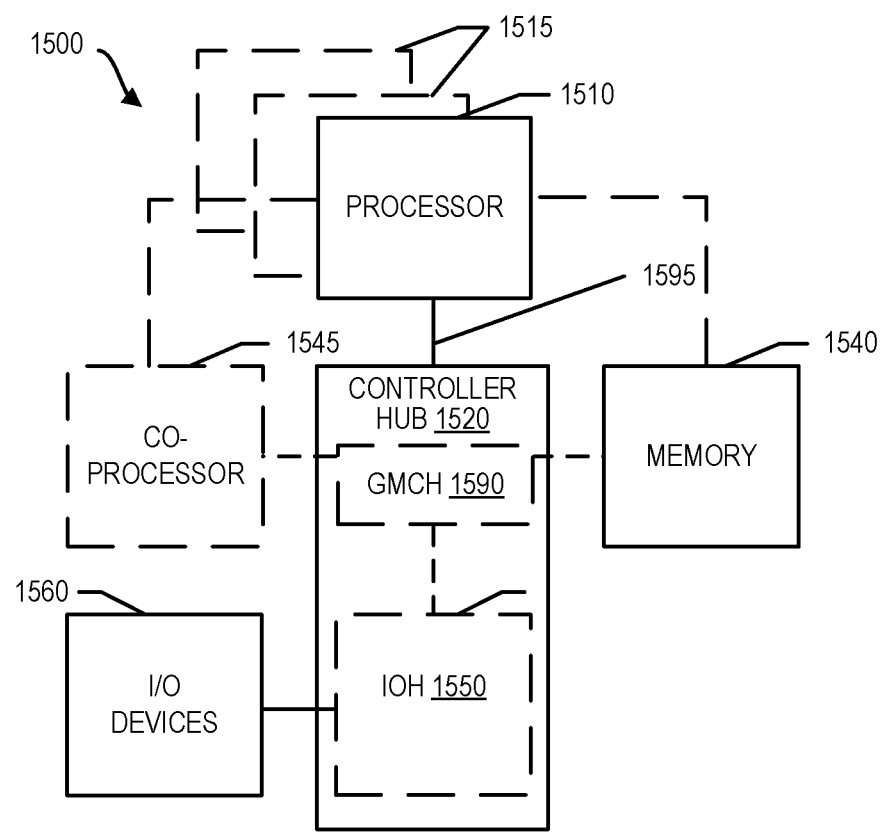
FIGS. 15-18 are block diagrams of exemplary computer architectures.

Referring now to FIG. 15, shown is a block diagram of a system 1500 in accordance with at least one embodiment of the present disclosure. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
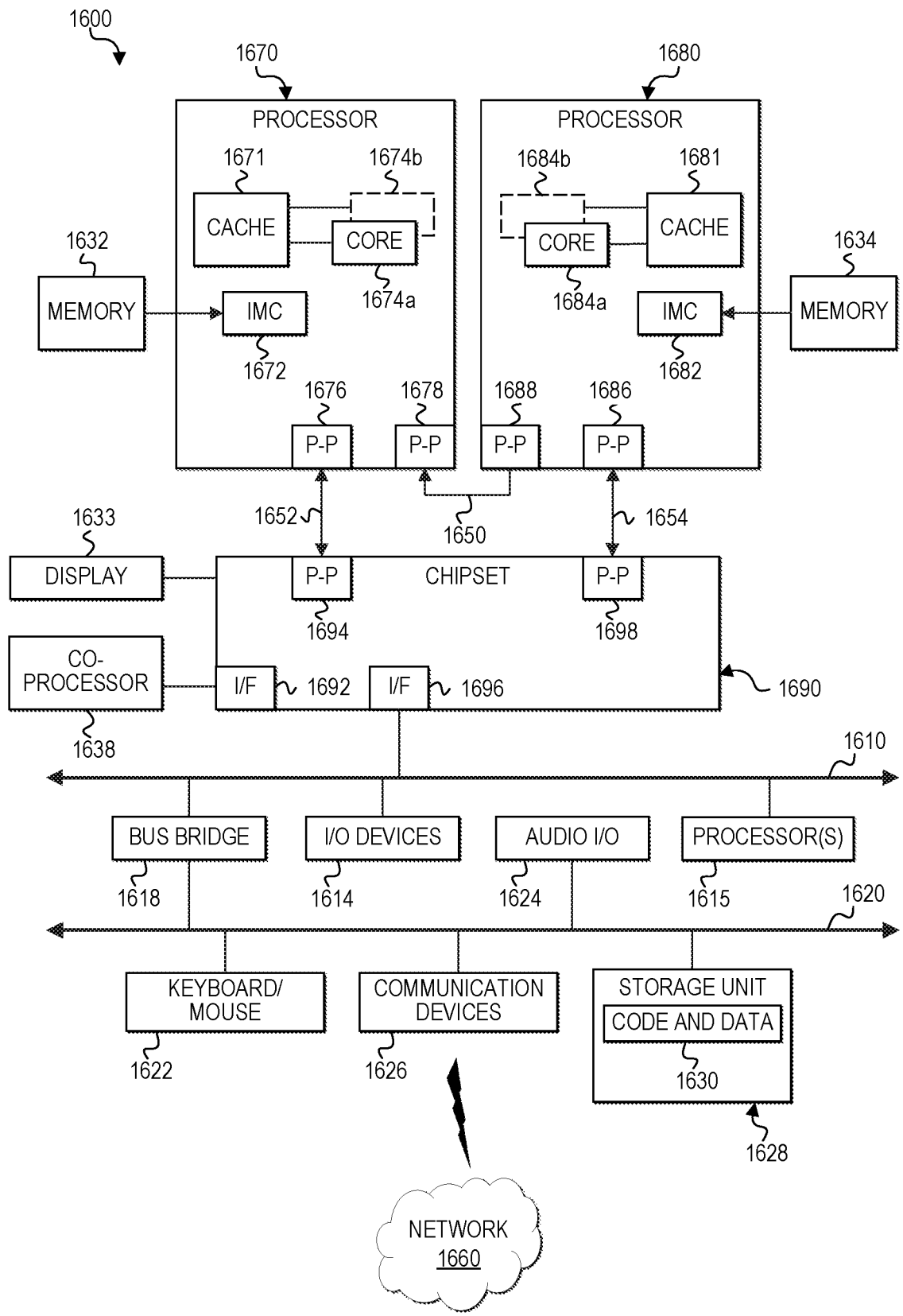

Referring now to FIG. 16, shown is a block diagram of a first more specific exemplary system 1600 in accordance with one or more embodiments of the present disclosure. As shown in FIG. 16, multiprocessor system 1600 is a point-to-point interconnect system, and includes a first processor 1670 and a second processor 1680 coupled via a point-to-point interconnect 1650. Processors 1670 and 1680 may be any type of processor, such as those shown or discussed in connection with the other figures. For example, each of processors 1670 and 1680 may be some version of the processor 1400. In another example, processors 1670 and 1680 are respectively processors 1510 and 1515, while coprocessor 1638 is coprocessor 1545. In yet another example, processors 1670 and 1680 are respectively processor 1510 and coprocessor 1545.

Processors 1670 and 1680 may be implemented as single core processors 1674a and 1684a or multi-core processors 1674a-1674b and 1684a-1684b. Each of cores 1674a-1674b and 1684a-1684b may be some version of the core 1290. Processors 1670 and 1680 may each include a cache 1671 and 1681 used by their respective core or cores. A shared cache (not shown) may be included in either processors or outside of both processors yet connected with the processors via P-P interconnect, such that either or both processors' local cache information may be stored in the shared cache if a processor is placed into a low power mode.

Processors 1670 and 1680 are shown including integrated memory controller (IMC) units 1672 and 1682, respectively, to communicate with memory elements 1632 and 1634, which may be portions of main memory locally attached to the respective processors or may be high bandwidth memory (HBM) in some embodiments. In some embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like. Optionally, chipset 1690 may also communicate with a display 1633 for displaying data that is viewable by a human user.

A shared cache (e.g., 1671 and/or 1681) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1610 via an interface 1696. In one embodiment, first bus 1610 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1610, along with a bus bridge 1618 which couples first bus 1610 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1610. In one embodiment, second bus 1620 may be a low pin count (LPC) bus. Various devices may be coupled to a second bus 1620 including, for example, a keyboard and/or mouse 1622, or other input devices (e.g., a touch screen, trackball, joystick, etc.), communication devices 1626 (e.g., modems, network interface devices, or other types of communication devices that may communicate through a network 1660), audio I/O devices 1614, and/or a storage unit 1628 (e.g., a disk drive or other mass storage device, which may include instructions/code and data 1630). Further, an audio I/O 1624 may be coupled to the second bus 1620. Note that other architectures are possible. For example, instead of the point-to-point architecture of FIG. 16, a system may implement a multi-drop bus or other such architecture.

Figure 17:
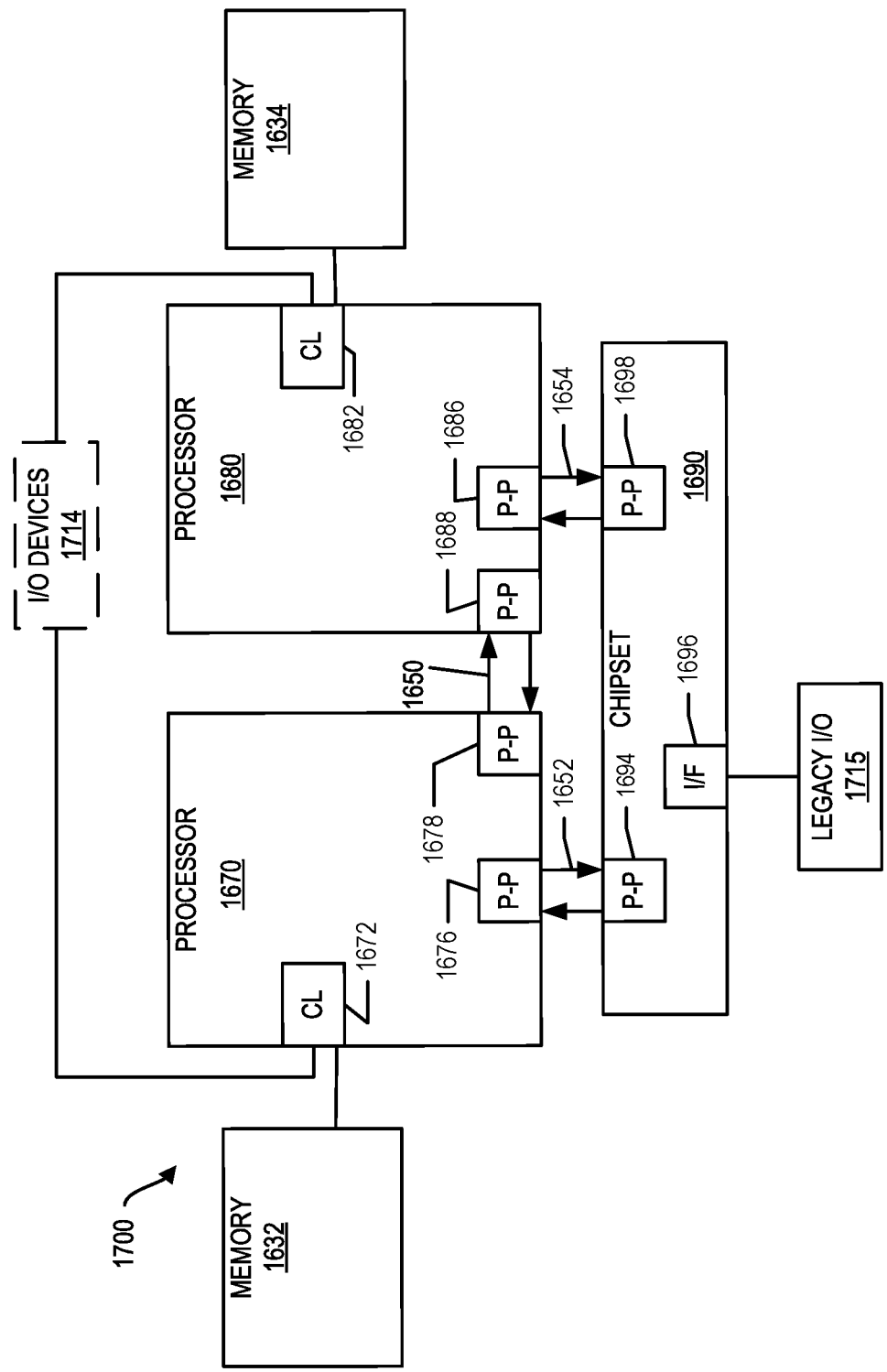

Referring now to FIG. 17, shown is a block diagram of a second more specific exemplary system 1700 in accordance with at least one embodiment of the present disclosure. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
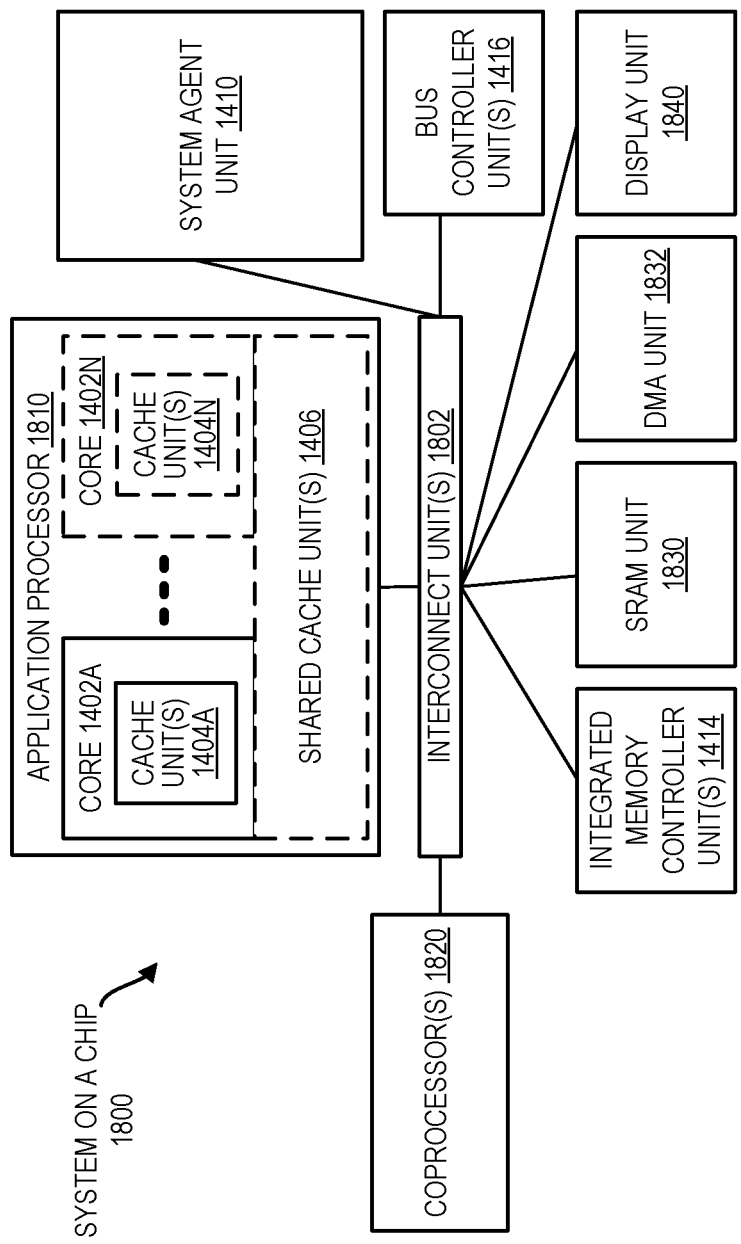

Referring now to FIG. 18, shown is a block diagram of a SoC 1800 in accordance with at least one embodiment of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of this disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable (e.g., or computer-readable) medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
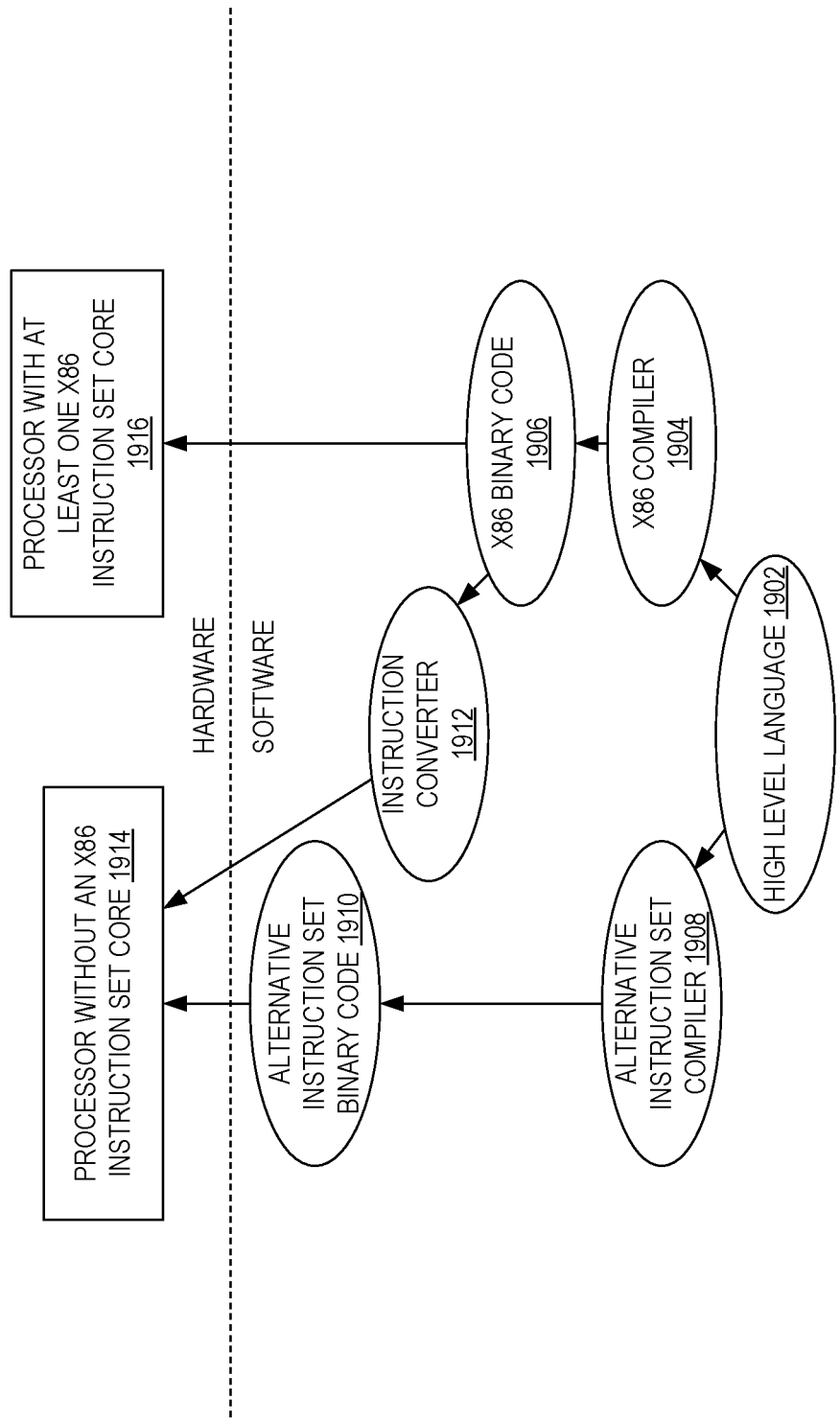
FIG. 19 is a block diagram contrasting the use of a software instruction converter to convert binary instructions in a source instruction set to binary instructions in a target instruction set according to embodiments of the present disclosure.

FIG. 19 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Note that with the numerous examples provided herein, interaction may be described in terms of two, three, four, or more network elements, hosts, devices, computing systems, modules, and/or other components. However, this has been done for purposes of clarity and example only. It should be appreciated that the system can be consolidated or divided (e.g., segmented, partitioned, separated, etc.) in any suitable manner. Along similar design alternatives, any of the illustrated controllers, limiters, decoders, modules, nodes, elements, hosts, devices, systems, and other components of the FIGURES may be combined in various possible configurations, all of which are clearly within the broad scope of this specification. It should be appreciated that the proactive Di/Dt voltage droop mitigation concepts, shown and described with reference to the FIGURES (and their teachings), are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, the systems (e.g., by processor 100). Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase "at least one of" refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Additionally, the words "optimize," "optimization," "optimum," "optimal," and related terms are terms of art that refer to improvements in speed and/or efficiency of a specified outcome and do not purport to indicate that a process for achieving the specified outcome has achieved, or is capable of achieving, a perfectly speedy/perfectly efficient state.

While this specification contains many specific implementation details, these should not be construed as limitations on the scope of any embodiments or of what may be claimed, but rather as descriptions of features specific to particular embodiments of the proactive Di/Dt voltage droop mitigation concepts disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. The system, apparatus, method, and machine readable storage medium embodiments can include one or a combination of the following examples:

Example A1 provides an apparatus comprising an execution unit; rate controller circuitry; an instruction scheduler coupled to the rate controller circuitry and the execution unit. The instruction scheduler is to: identify a first high power instruction in an instruction stream to be executed; and assert a pre-charge signal to the rate controller circuitry. The rate controller circuitry is to: subsequent to the pre-charge signal being asserted, assert a voltage boost signal to cause a supply voltage for the execution unit to be increased; and de-assert the voltage boost signal based at least in part on the first high power instruction being executed.

In Example A2, the subject matter of Example A1 can optionally include where the first high power instruction is an instruction to multiply matrices.

In Example A3, the subject matter of any one of Examples A1-A2 can optionally include where the instruction scheduler is to assert the pre-charge signal in response to scheduling the first high power instruction for execution.

In Example A4, the subject matter of any one of Examples A1-A3 can optionally include where the rate controller circuitry is further to delay asserting the voltage boost signal based on a start delay time.

In Example A5, the subject matter of Example A4 can optionally include where the start delay time is to expire before the execution unit initiates execution of the first high power instruction.

In Example A6, the subject matter of any one of Examples A1-A5 can optionally include where the rate controller circuitry is to: receive a busy signal from the execution unit, the busy signal indicating that the execution unit initiated execution of the first high power instruction; and delay de-asserting the voltage boost signal based on a hold time.

In Example A7, the subject matter of any one of Examples A1-A3 can optionally include where the rate controller circuitry is further to delay asserting the voltage boost signal based on a start delay time and delay de-asserting the voltage boost signal based on a hold time, where the rate controller circuitry includes, a start delay counter programmed with a start delay count value corresponding to the start delay time and a stop delay counter programmed with a stop delay count value corresponding to the hold time.

In Example A8, the subject matter of any one of Examples A1-A7 can optionally include where the instruction scheduler is further to identify a second high power instruction prior to the voltage boost signal being de-asserted and refrain from asserting a second voltage boost signal for the second high power instruction.

Example S1 provides a system comprising an execution unit, an instruction scheduler coupled to the execution unit, rate controller circuitry coupled to the execution unit and the instruction scheduler, and a voltage regulator coupled to the rate controller circuitry. The instruction scheduler is to identify a first high power instruction in an instruction stream to be executed and assert a pre-charge signal. The rate controller circuitry is to, subsequent to the pre-charge signal being asserted, assert a voltage boost signal. The voltage regulator is to, in response to receiving the voltage boost signal, increase a supply voltage for the execution unit to execute the first high power instruction.

In Example S2, the subject matter of Example S1 can optionally include where the execution unit is further to: subsequent to the voltage boost signal being asserted, initiate an execution of the first high power instruction; and assert a busy signal indicating that the first high power instruction is executing.

In Example S3, the subject matter of Example S2 can optionally include where the rate controller circuitry is further to de-assert the voltage boost signal based, at least in part, on the busy signal being asserted.

In Example S4, the subject matter of Example S3 can optionally include where the voltage regulator is further to decrease the supply voltage for the execution unit subsequent to the voltage boost signal being de-asserted.

In Example S5, the subject matter of any one of Examples S1-S4 can optionally include where the instruction scheduler is further to identify a second high power instruction in the instruction stream and assert a second pre-charge signal. The rate controller circuitry is further to assert, subsequent to the second pre-charge signal being asserted, a second voltage boost signal. The voltage regulator is further to, in response to receiving the second voltage boost signal, increase the supply voltage for the execution unit to execute the second high power instruction.

In Example S6, the subject matter of any one of Examples S1-S5 can optionally include where the instruction scheduler is to assert the pre-charge signal in response to scheduling the first high power instruction for execution.

In Example S7, the subject matter of any one of Examples S1-S6 can optionally include where the rate controller circuitry is further to delay asserting the voltage boost signal based on a start delay time.

In Example S8, the subject matter of Example S7 can optionally include where the start delay time is to expire before the execution unit initiates execution of the first high power instruction.

In Example S9, the subject matter of any one of Examples S1-S8 can optionally include where the voltage regulator increasing the supply voltage is to coincide with the execution unit initiating an execution of the first high power instruction.

Example M1 provides a method comprising: identifying, by an instruction scheduler of a processor core, a first high power instruction in an instruction stream to be executed by an execution unit of the processor core; asserting a pre-charge signal indicating that the first high power instruction is scheduled for execution; subsequent to the pre-charge signal being asserted, asserting a voltage boost signal to cause a supply voltage for the execution unit to be increased; receiving, from the execution unit, a busy signal indicating that the first high power instruction is executing; and based at least in part on the busy signal being asserted, de-asserting the voltage boost signal.

In Example M2, the subject matter of Example M1 can optionally include where the first high power instruction is an instruction to multiply matrices.

In Example M3, the subject matter of any one of Examples M1-M2 can optionally include where the pre-charge signal is asserted in response to scheduling the first high power instruction for execution.

In Example M4, the subject matter of any one of Examples M1-M3 can optionally include delaying the asserting the voltage boost signal based on a start delay time.

In Example M5, the subject matter of Example M4 can optionally include where wherein the start delay time is to expire before the first high power instruction is executed.

In Example M6, the subject matter of any one of Examples M1-M5 can optionally include delaying the de-asserting of the voltage boost signal based on a hold time.

In Example M7, the subject matter of any one of Examples M1-M3 can optionally include delaying the asserting the voltage boost signal based on a start delay time and delaying the de-asserting the voltage boost signal based on a hold time, where a start delay counter is programmed with a start delay count value corresponding to the start delay time, and where a stop delay counter is programmed with a stop delay count value corresponding to the hold time.

In Example M8, the subject matter of any one of Examples M1-M7 can optionally include identifying a second high power instruction prior to the voltage boost signal being de-asserted and refraining from asserting a second voltage boost signal for the second high power instruction.

In Example M9, the subject matter of any one of Examples M1-M8 can optionally include decreasing the supply voltage for the execution unit subsequent to the de-asserting the voltage boost signal.

An Example Y1 provides an apparatus, the apparatus comprising means for performing the method of any one of the Examples M1-M9.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples M1-M9.

In Example Y4, the subject matter of any one of Examples Y1-Y3 can optionally include that the apparatus is one of a computing system or a system-on-a-chip.

An Example X1 provides one or more computer-readable media comprising instructions, where the instructions when executed realize an apparatus, realize a system, or implement a method in any one of the preceding Examples A1-A8, S1-S9, M1-M9, and Y1-Y4.

What is claimed is:

1. An apparatus comprising:
    an execution unit;
    rate controller circuitry;
    an instruction scheduler coupled to the rate controller circuitry and the execution unit, the instruction scheduler to:
        identify a first high power instruction in an instruction stream to be executed; and
        assert a pre-charge signal to the rate controller circuitry, wherein the rate controller circuitry is to:
            subsequent to the pre-charge signal being asserted, assert a voltage boost signal to cause a supply voltage for the execution unit to be increased; and
            de-assert the voltage boost signal based at least in part on receiving a busy signal indicating that an execution of the first high power instruction was initiated.

2. The apparatus of claim 1, wherein the first high power instruction is an instruction to multiply matrices.

3. The apparatus of claim 1, wherein the instruction scheduler is to assert the pre-charge signal in response to scheduling the first high power instruction for execution.

4. The apparatus of claim 1, wherein the rate controller circuitry is further to:
    delay asserting the voltage boost signal based on a start delay time.

5. The apparatus of claim 4, wherein the start delay time is to expire before the execution unit initiates an execution of the first high power instruction.

6. The apparatus of claim 1, wherein the rate controller circuitry is to:
    receive the busy signal from the execution unit; and
    delay de-asserting the voltage boost signal based on a hold time.

7. The apparatus of claim 1, wherein the rate controller circuitry is further to:
    delay asserting the voltage boost signal based on a start delay time; and
    delay de-asserting the voltage boost signal based on a hold time, wherein the rate controller circuitry includes:
        a start delay counter programmed with a start delay count value, wherein the start delay count value corresponds to the start delay time; and
        a stop delay counter programmed with a stop delay count value, wherein the stop delay count value corresponds to the hold time.

8. The apparatus of claim 1, wherein the instruction scheduler is further to:
    identify a second high power instruction prior to the voltage boost signal being de-asserted; and
    refrain from asserting a second voltage boost signal for the second high power instruction.

9. A system comprising:
    an execution unit;
    an instruction scheduler coupled to the execution unit, the instruction scheduler to:
        identify a first high power instruction in an instruction stream to be executed; and
        assert a pre-charge signal;
    rate controller circuitry coupled to the execution unit and the instruction scheduler, the rate controller circuitry to:
        subsequent to the pre-charge signal being asserted, assert a voltage boost signal; and
        de-assert the voltage boost signal based, at least in part, on receiving a busy signal indicating that the first high power instruction is executing; and
    a voltage regulator coupled to the rate controller circuitry, the voltage regulator to:
        in response to receiving the voltage boost signal, increase a supply voltage for the execution unit to execute the first high power instruction.

10. The system of claim 9, wherein the execution unit is further to:
    subsequent to the voltage boost signal being asserted, initiate an execution of the first high power instruction; and
    assert the busy signal.

11. The system of claim 9, wherein the voltage regulator is further to:
decrease the supply voltage for the execution unit subsequent to the voltage boost signal being de-asserted.

12. The system of claim 11, wherein the instruction scheduler is further to:
identify a second high power instruction in the instruction stream; and
assert a second pre-charge signal,
wherein the rate controller circuitry is further to assert, subsequent to the second pre-charge signal being asserted, a second voltage boost signal, and
wherein the voltage regulator is further to, in response to receiving the second voltage boost signal, increase the supply voltage for the execution unit to execute the second high power instruction.

13. The system of claim 9, wherein the instruction scheduler is to assert the pre-charge signal in response to scheduling the first high power instruction for execution.

14. The system of claim 9, wherein the rate controller circuitry is further to:
delay asserting the voltage boost signal based on a start delay time.

15. The system of claim 14, wherein the start delay time is to expire before the execution unit initiates an execution of the first high power instruction.

16. The system of claim 9, wherein the voltage regulator increasing the supply voltage is to coincide with the execution unit initiating an execution of the first high power instruction.

17. A method, the method comprising:
identifying, by an instruction scheduler of a processor core, a first high power instruction in an instruction stream to be executed by an execution unit of the processor core;
asserting a pre-charge signal indicating that the first high power instruction is scheduled for execution;
subsequent to the pre-charge signal being asserted, asserting a voltage boost signal to cause a supply voltage for the execution unit to be increased;
receiving, from the execution unit, a busy signal indicating that the first high power instruction is executing; and
based at least in part on the busy signal being asserted, de-asserting the voltage boost signal.

18. The method of claim 17, further comprising:
delaying the de-asserting of the voltage boost signal based on a hold time.

19. The method of claim 17, further comprising:
decreasing the supply voltage for the execution unit subsequent to the de-asserting the voltage boost signal.

20. One or more non-transitory computer-readable media with code stored thereon, wherein the code is executable to cause a machine to:
identify a first high power instruction in an instruction stream to be executed by an execution unit;
receive a pre-charge signal;
subsequent to the pre-charge signal being received, assert a voltage boost signal to cause a supply voltage for the execution unit to be increased; and
de-assert the voltage boost signal based at least in part on receiving a busy signal indicating that an execution of the first high power instruction was initiated.

21. The one or more non-transitory computer-readable media of claim 20, wherein the code is further executable to cause the machine to:
assert the pre-charge signal in response to scheduling the first high power instruction for execution.

22. The one or more non-transitory computer-readable media of claim 20, wherein the code is further executable to cause the machine to:
delay asserting the voltage boost signal based on a start delay time.

23. The one or more non-transitory computer-readable media of claim 20, wherein the code is further executable to cause the machine to:
receive the busy signal from the execution unit; and
delay de-asserting the voltage boost signal based on a hold time.

* * * * *